US007155408B2

(12) United States Patent
Hebbar et al.

(10) Patent No.: US 7,155,408 B2
(45) Date of Patent: Dec. 26, 2006

(54) METHOD AND APPARATUS FOR MANAGING INFORMATION AND COMMUNICATIONS RELATED TO MUNICIPAL BONDS AND OTHER SECURITIES

(75) Inventors: Sharda Hebbar, Longwood, FL (US); Mario Camchong, Orlando, FL (US)

(73) Assignee: Digital Assurance Certification L.L.C., Winter Park, FL (US)

( * ) Notice: Subject to any disclaimer, the term of this patent is extended or adjusted under 35 U.S.C. 154(b) by 705 days.

(21) Appl. No.: 10/314,863

(22) Filed: Dec. 9, 2002

(65) Prior Publication Data

US 2003/0204464 A1 Oct. 30, 2003

Related U.S. Application Data

(60) Provisional application No. 60/375,546, filed on Apr. 25, 2002.

(51) Int. Cl.
*G06F 17/60* (2006.01)

(52) U.S. Cl. ......................... 705/35; 705/36 R; 705/37

(58) Field of Classification Search ..................... None
See application file for complete search history.

(56) References Cited

U.S. PATENT DOCUMENTS

| | | | |
|---|---|---|---|
| 5,893,079 A | 4/1999 | Cwenar | 705/36 |
| 5,915,209 A | 6/1999 | Lawrence | 455/31.2 |

(Continued)

OTHER PUBLICATIONS

Securities and Exchange Commission letter addressed to Vinson & Elkins LLP dated Sep. 21, 2001, 2 pages.

(Continued)

*Primary Examiner*—Vincent Millin
*Assistant Examiner*—Debra Charles
(74) *Attorney, Agent, or Firm*—Pillsbury Winthorp Shaw Pittman LLP

(57) ABSTRACT

The present invention is a method and apparatus for gathering information from issuers of municipal securities and distributing information evenly to municipal disclosure repositories, regulatory bodies and the public. A central aspect of the present invention is a computer application, which can be implemented on a computer system that is attached to a network of computers and other communication devices, such as the Internet. Initially, the application accepts the full name description of a particular municipal security issue, together with a unique identifier assigned by CUSIP. The system grants a secured and encrypted user id and password to the issuer enabling the issuer to enter ongoing information about the issue. This information may include annual audits of the issuer, certain operating data, and any event notices deemed material by the issuer. Such information is provided to comply with the contractual obligations of the issuer to the bond holders and to provide Brokers and Dealers with a procedure for facilitating regulatory requirements that provide prompt notice of events relating to bonds they recommend to customers. For information that is required to be submitted on a periodic basis, the system determines when the information is due to be submitted, and prompts the issuer to file such information with the system. This information is then published to the public, and, simultaneously, transmitted to the municipal disclosure repositories and/or regulatory bodies via a one-click dissemination system. If the issuer does not submit the required information by the due date, the system files a notice that the required information was not submitted by the issuer. Additionally, the system establishes an audit trail for gathering and the distribution of the information. Another important aspect of the audit includes receiving and archiving a receipt that information was transmitted to the municipal disclosure repositories and/or regulatory body. Finally, the system provides a secure platform for communication and teleconferencing among issuers and their investors.

53 Claims, 27 Drawing Sheets

U.S. PATENT DOCUMENTS

| | | | | |
|---|---|---|---|---|
| 6,161,099 | A | 12/2000 | Harrington et al. | 705/37 |
| 6,381,585 | B1 | 4/2002 | Maples et al. | 705/36 |
| 6,446,047 | B1 | 9/2002 | Brier et al. | 705/35 |
| 6,557,009 | B1 * | 4/2003 | Singer et al. | 707/104.1 |
| 2001/0051935 | A1 * | 12/2001 | Sugiura | 706/12 |
| 2002/0016758 | A1 | 2/2002 | Grigsby | 705/36 |
| 2002/0099646 | A1 | 7/2002 | Agarwal et al. | 705/37 |
| 2002/0128954 | A1 * | 9/2002 | Evans | 705/37 |
| 2002/0156719 | A1 | 10/2002 | Finebaum et al. | 705/37 |
| 2003/0046205 | A1 | 3/2003 | Brier et al. | 705/35 |
| 2003/0046206 | A1 | 3/2003 | Sato | 705/35 |
| 2003/0110106 | A1 | 6/2003 | Deshpande et al. | 705/36 |
| 2003/0120578 | A1 * | 6/2003 | Newman | 705/36 |
| 2003/0126055 | A1 | 7/2003 | Thal et al. | 705/36 |
| 2003/0149654 | A1 | 8/2003 | Harrington et al. | 705/36 |
| 2003/0225655 | A1 | 12/2003 | Hughes, Jr. et al. | 705/36 |

OTHER PUBLICATIONS

Hume, Lynn, "SEC: Broker-Dealers Can Use DAC Instead of NRMSIRs for Rule 15c2-12", reprinted from *The Bond Buyer*, Sep. 25, 2001, 1 page.

* cited by examiner

| | | | Friday, October 26, 2001 | | | |
|---|---|---|---|---|---|---|
| Name: Mario | | | | | | |
| | Cusip Number | Complete Issue Description | Date | File Continuing Disclosure | File Material Events | NRMSIR Status | Edit | Delete |
| 1 | 111133P<br>DM3, DS8, DT9,..... | Test Issue:<br>$75,000,000, Series 2000B, | 10/12/2001 | ▢ | 🗁 | ☞ | 🔍 | ☒ |
| 2 | 211133G<br>EV1, EW5, Ez8 | Test Issue:<br>$80,000,000, Series 2000A, | 10/12/2001 | ▢ | 🗁 | ☞ | 🔍 | ☒ |
| 3 | 111133B<br>AA2, AB4, AC5,..... | Test Issue:<br>$100,000,000, Series 2001A, | 10/12/2001 | ▢ | 🗁 | ☞ | 🔍 | ☒ |
| 4 | 59334K<br>AW8, AX6, AY4,..... | Test Issue: | 10/12/2001 | ▢ | 🗁 | ☞ | 🔍 | ☒ |
| 5 | 59334K<br>AA6, AB4, AC2 | Test Issue<br>Toll System Revenue Bonds, Series 2000 $150,000,000 | 08/23/2001 | | | | | |

302, 304, 306

300

- issue information form
- investor communication platform
- investor messaging — 312
- conference calling — 310
- disclosure library
- about compliance reporting
- SEC letter
- Portfolio — 314

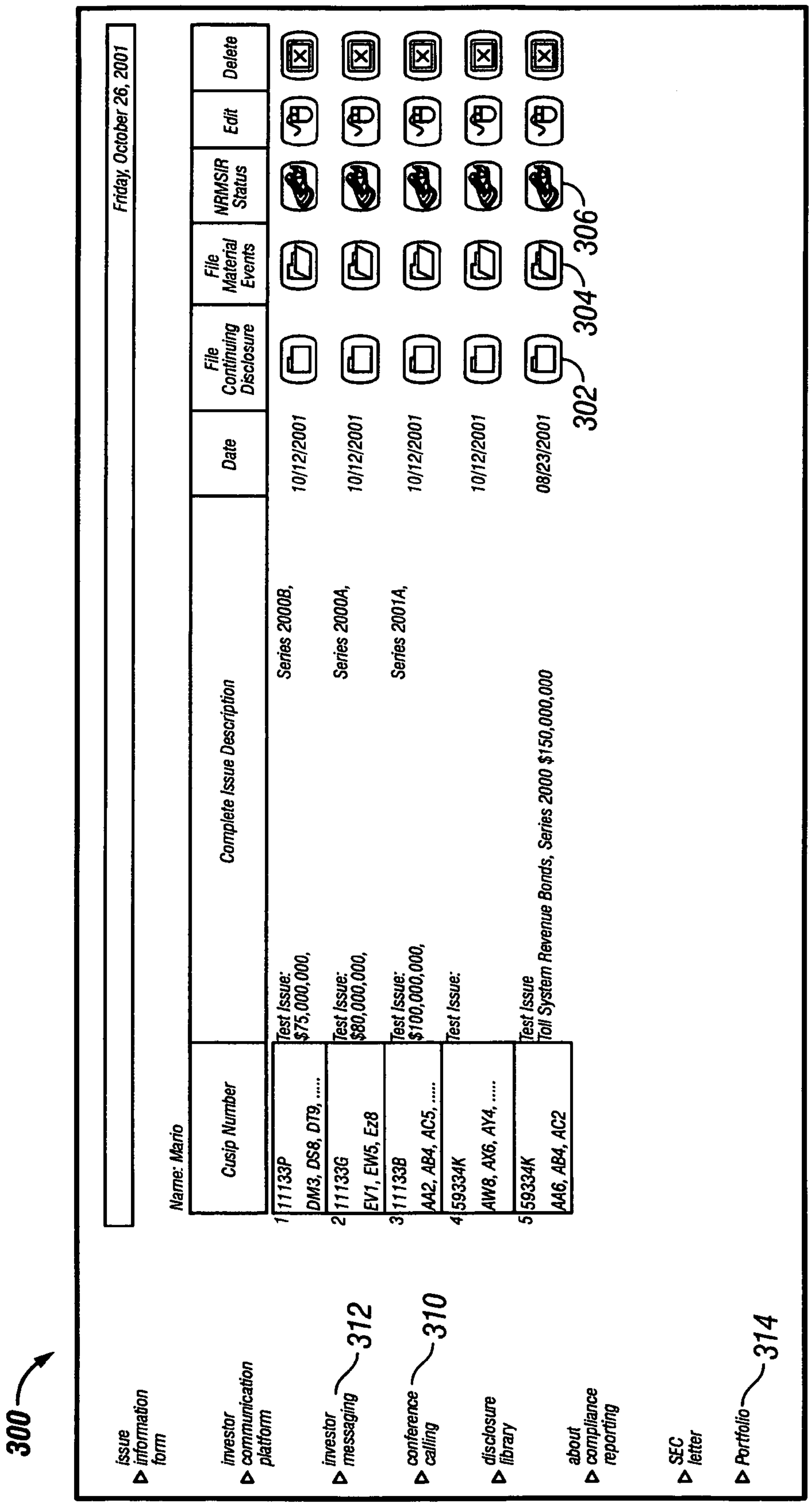

| | Tuesday, November 6, 2001 |

▷ Portfolio
▷ investor communication platform
▷ investor messaging
▷ conference calling
▷ disclosure library
▷ about compliance reporting
▷ SEC letter

* Required input fields

Issue Information Form

Complete Issue Description*  — Complete Issue Description Test

Issuer*  — Issuer Test

Obligor*  — Obligor Test
i.e., exact name of municipality, hospital, developer, etc.

CUSIP Base#*  — 85225A (6 digits)

Last 3 digits of CUSIP#*  — BC4, ST3
(separate by commas)

Web Address  — http://
County  — County Test
City  — City Test     State* FL

Record Number
Bondmaster/Cert Master Account Name

Obligor Contact Information

Obligor Contact Person  — Obligor Contact Person Test
Contact Person's Title  — Contact Person Title Test
Contact Person's Firm Name  — Contact Person's Firm Name Test Email Address*  — Test @

Telephone Number  — 407 - 123-4567  Ext. 123
Fax Number  — 407 - 123-5689

Mailing Address  — 250 Park Ave
                   Suite 305

City  — Winter Park     State FL
Zip Code  — 32789 -

Trustee Information

Administrator Name*  — Test

Trustee Bank*  — Test Federal Bank

Phone No.*  — 123  456-7890  Ext. 321

Bond Counsel Information

Bond Counsel Firm Name  — Bond Counsel Firm Name Test

Firm Contact  — Test

Phone No.  — 321  654-9874  Ext. 65623

Next — 402

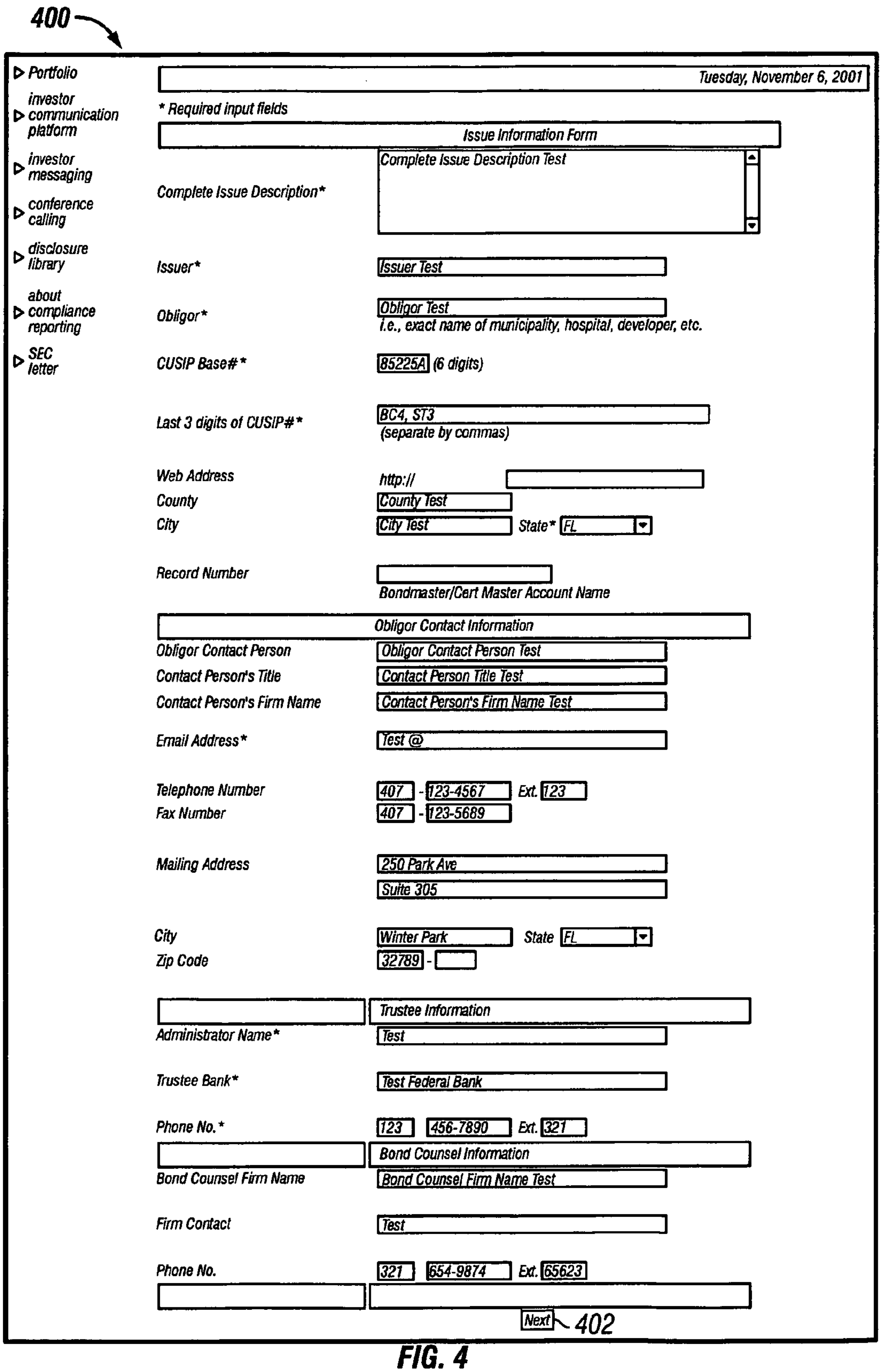

FIG. 4

Input Sheet Information

*Please check CUSIP Number and each Suffix before submitting this information to DAC. To correct any information, scroll to the bottom of the screen and select the Edit button.

Issuer Information

| | |
|---|---|
| Complete Issue Description | Complete Issue Description Test |
| Issuer | Issuer Test |
| Obligor | Obligor Test |
| CUSIP Number (6 digit) | 85226A |
| CUSIP Suffix (Last 3 digits) | BC4, ST3 |
| Record Number | |
| Web Address | http:h |
| County | County Test |
| City | City Test |
| State | FL |

Obligor Contact Information

| | |
|---|---|
| Obligor Contact Person | Obligor Contact Person Test |
| Contact Person's Title | Contact Person Title Test |
| Contact Person's Firm Name | Contact Person's Firm Name Test |
| Email Address | |
| Telephone Number | 407 - 123-4567 Ext: 123 |
| Fax Number | 407 - 123-5689 |
| Mailing Address | 250 Park Ave |
| | Suite 305 |
| City | Winter Park |
| State | FL |
| Zip Code | 32789 |

Trustee Contact Information

| | |
|---|---|
| Administrator Name | |
| Trustee Bank | |
| Phone No. | 123-456-7890 Ext. 321 |

Bond Counsel Information

| | |
|---|---|
| Bond Counsel Firm Name | Bond Counsel Firm Name Test |
| Firm Contact | Test |
| Phone No. | 321-654-9874 Ext. 65623 |

[Add Issuer] — 502
[Edit Info]

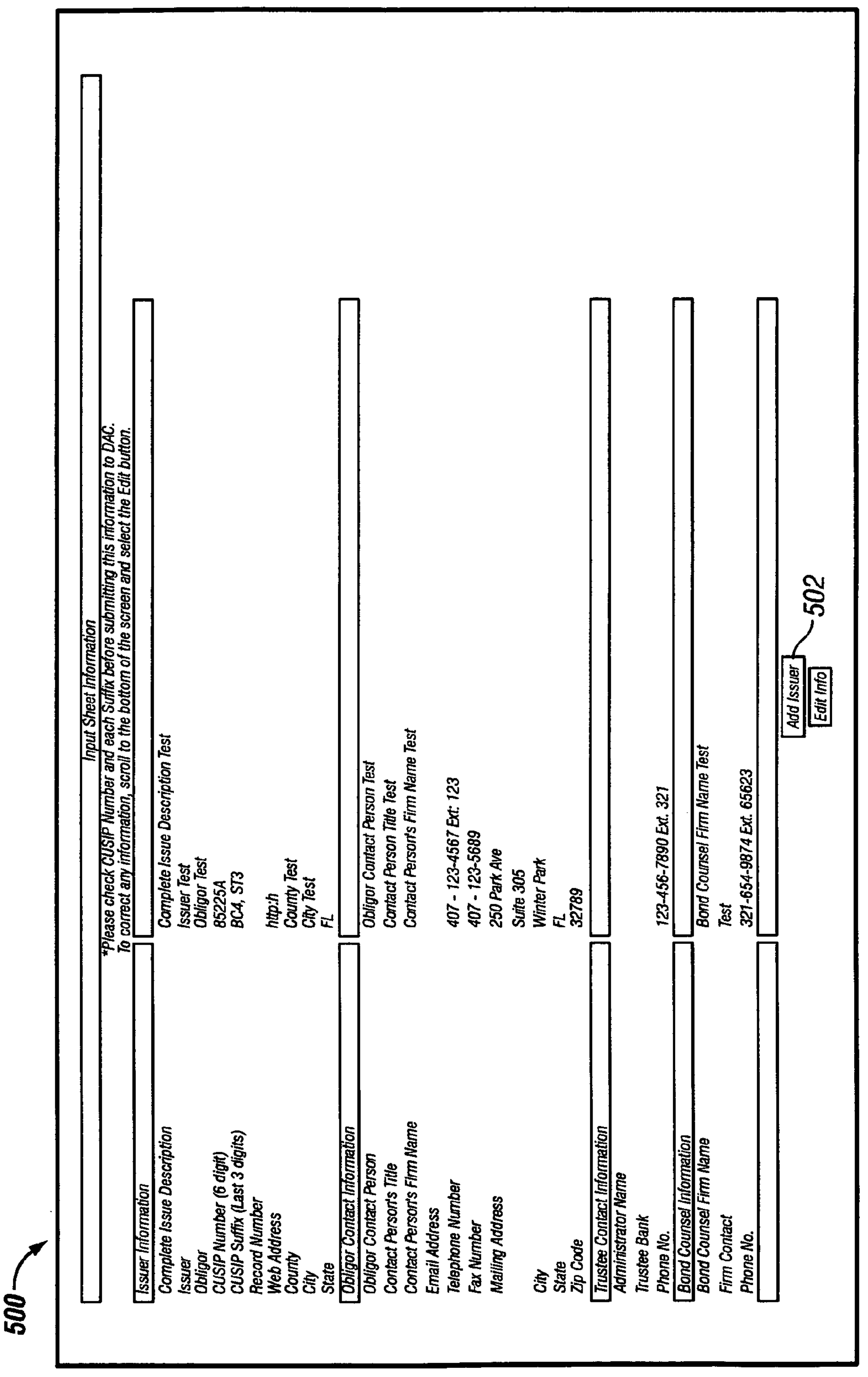

FIG. 5

Continuing Disclosure Information

To view your filed continuing disclosures, CLICK HERE.

To file a new continuing disclosure, select the applicable Description(s) listed below. You may select one or more document descriptions and click the Next button.

Upon completion of the Continuing Disclosure Document input you may disseminate the information to all required repositories by clicking on the send to NRMSIRs button. This information is posted to the investor communication center for public viewing.

Bond Documents :
- ☐ Official Statement
- ☐ Continuing Disclosure Amendment

Pre Defined Document Descriptions :
- ☐ Operating Data
- ☐ Audited Financial Statements
- ☐ CAFR
- ☒ Unaudited Financial Statement 1st Qtr
- ☐ Unaudited Financial Statement 3rd Qtr
- ☐ Unaudited Financial Statement 4th Qtr
- ☐ Executive Summary
- ☐ News Release
- ☐ Mgmt Discussions and Analysis
- ☐ Unaudited Financial Statement 2nd Qtr
- ☐ Unaudited Financial Statements Customized Document Descriptions
- ☐ Custom — 906

[ Next ] — 908

COmplete Issue Description Test

| Continuing Disclosure Information | | | | |
|---|---|---|---|---|
| Event Type | Date Due | Date Submitted | Delete | Send to NRMSIRS |
|  |  |  |  |  |

902 (bracket grouping Pre Defined Document Descriptions)

900

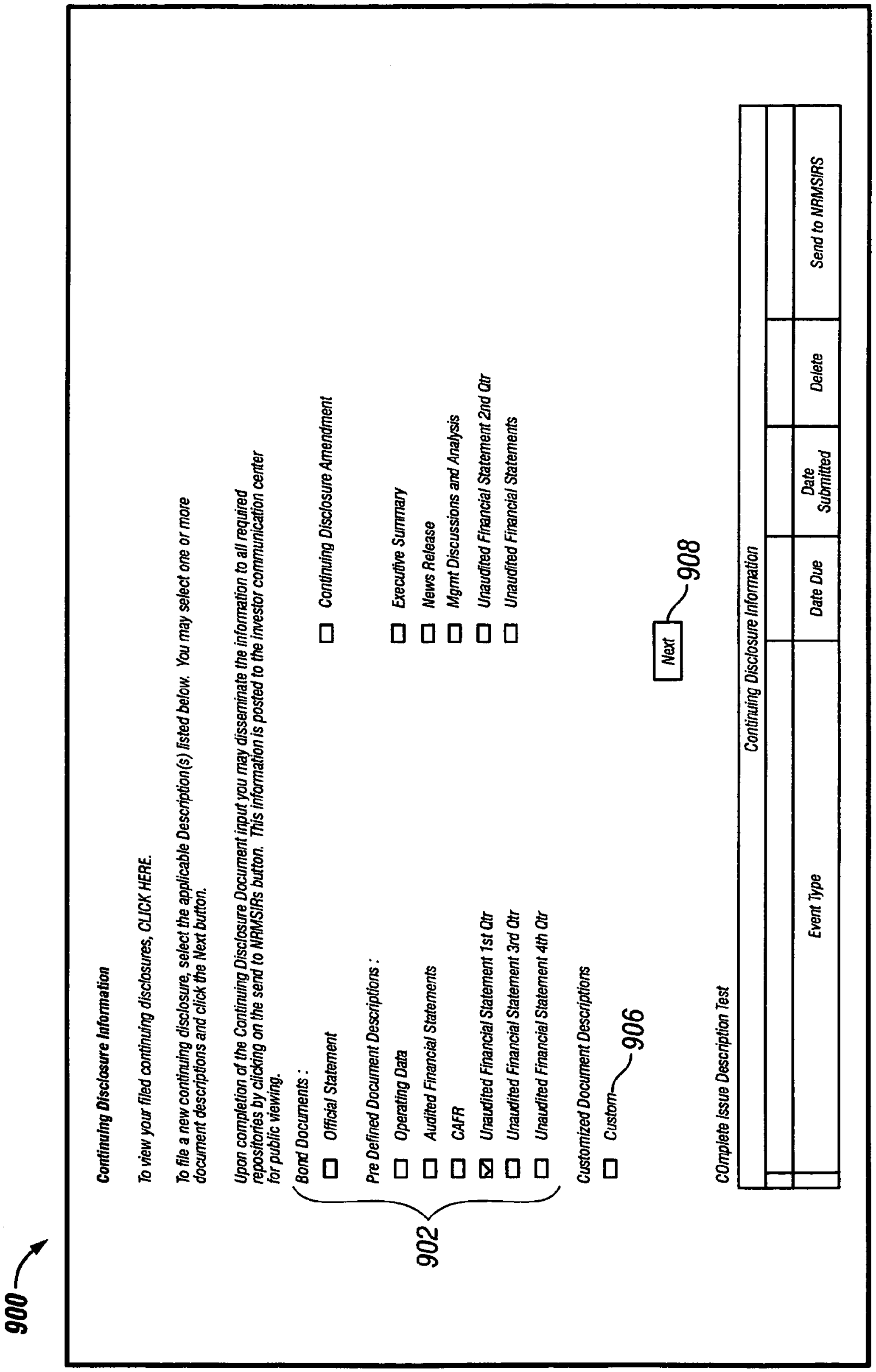

Update Disclosure Information
After entering information requested below, a completed document will be prepared for your review.
You may edit this document prior to submitting to the DAC database for dissemination.

| Unaudited Financial Statement 1st Qtr |

1002 — * Filing: [Annual ▼]
1004 — * Select Filing field to be notified by email of your document Due Date.
       — Date of Disclosure [12/31/2000]  (ex. mm/dd/yyyy)
1006 — Fiscal Year End Date [09/30]  (ex. mm/dd)

1008 {
  Due Date [          ]  (ex. mm/dd/yyyy)
  -or-
  Number of days from Fiscal Year End
  [90]
}

1010 {
  Attach HTML File * OPTIONAL
  If you would like to attach information supporting your continuing disclosure, please click here:
  [            ]  [Browse...]

Attach NATIVE File * OPTIONAL
  If you would like to attach information supporting your continuing disclosure, please click here:
  [S:\Projects\Bank of NY]  [Browse...]
}

1012
[            | Next |            ]

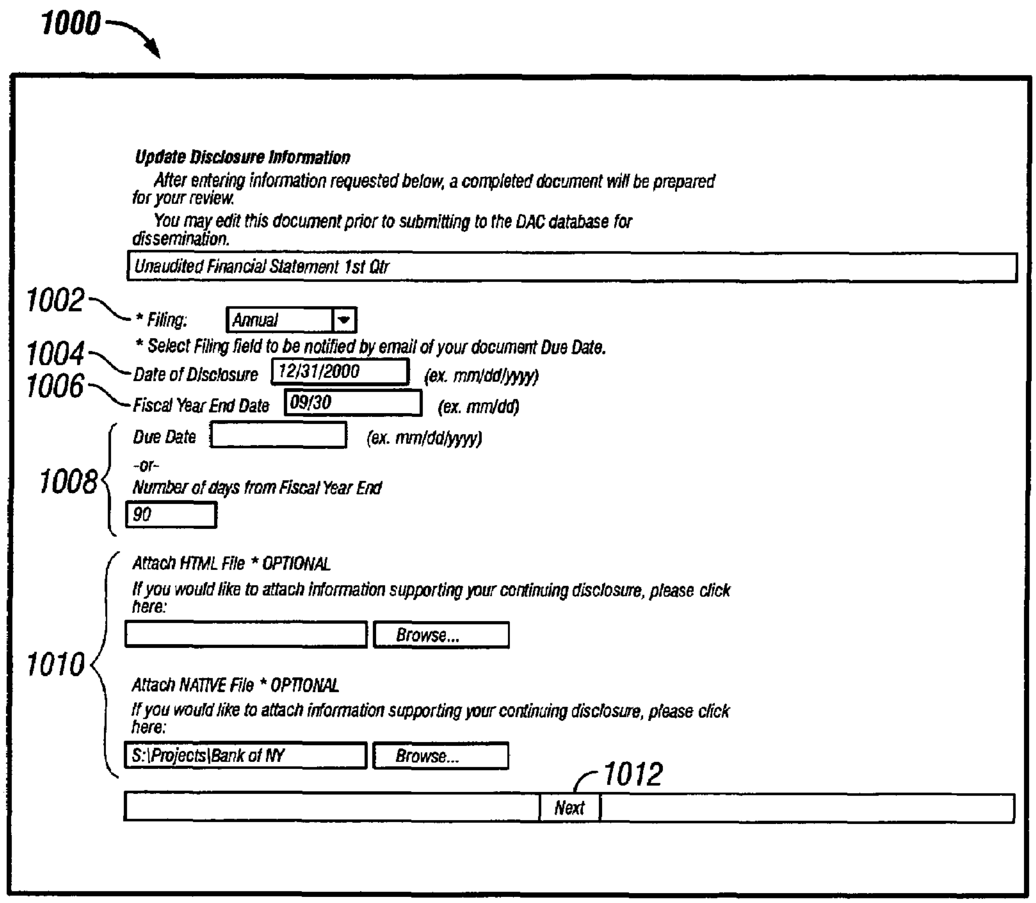

FIG. 10

Continuing Disclosure Information

To view your filed continuing disclosures, CLICK HERE.

To file a new continuing disclosure, select the applicable Description(s) listed below. You may select one or more document descriptions and click the Next button.

Upon completion of the Continuing Disclosure Document input you may disseminate the information to all required repositories by clicking on the send to NRMSIRs button. This information is posted to the investor communication center for public viewing.

Bond Documents:
☐ Official Statement ☐ Continuing Disclosure Amendment

Pre Defined Document Descriptions:
☐ Operating Data ☐ Executive Summary
☐ Audited Financial Statements ☐ News Release
☐ CAFR ☐ Mgmt Discussions and Analysis
☐ Unaudited Financial Statement 1st Qtr ☐ Unaudited Financial Statement 2nd Qtr
☐ Unaudited Financial Statement 3rd Qtr ☐ Unaudited Financial Statements
☐ Unaudited Financial Statement 4th Qtr

Customized Document Descriptions
☐ Custom

[ Next ]

COmplete Issue Description Test

| Continuing Disclosure Information | | | | |
|---|---|---|---|---|
| Event Type | Date Due | Date Submitted | Delete | Send to NRMSIRS |
| 1. Unaudited Financial Statement 1st Qtr | 12/29/2000 | 11/06/2001 | ☒ — 1104 | ⇧ — 1106 |

Html: Upload Now
Native: Bank of New York Draft Letters.doc

1100 ← (page marker)
1102 → (column marker)

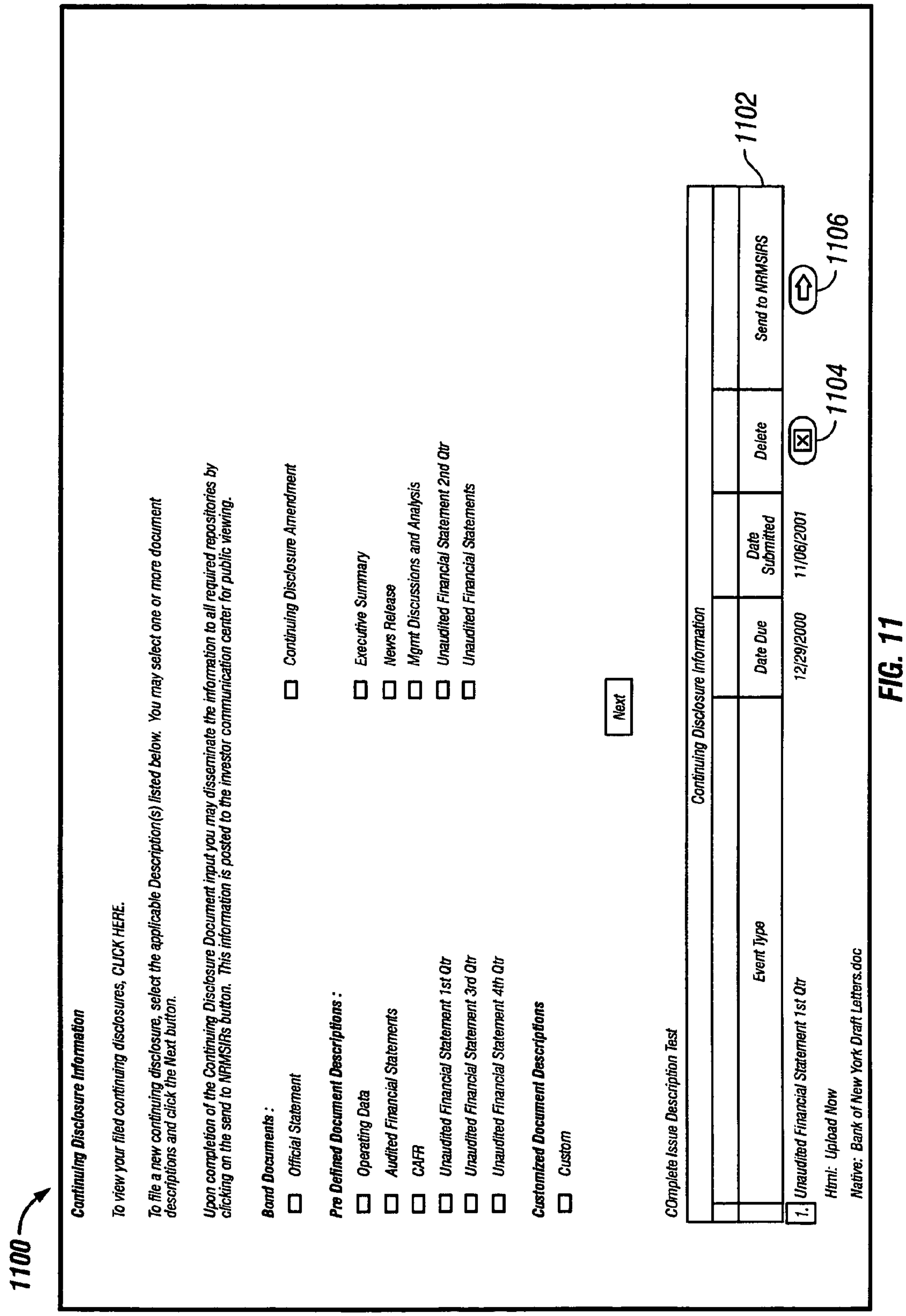

FIG. 11

Material Event Notice

To view your filed material events, CLICK HERE. To file a Material Event Notice select the applicable Event listed below. A wizard will appear to prompt you to enter the required information necessary to produce the cover sheet in the format recommended by the MSRB. You also have the option to attach additional information. DAC then disseminates the information to all required repositories. This information is posted to the investor communication center for public viewing.

- Principal and interest payment delinquencies
- Non-payment related defaults
- Unscheduled draws on debt service reserves reflecting financial difficulties
- Unscheduled draws on credit enhancements reflecting financial difficulties
- Substitution of credit or liquidity providers, or their failure to perform
- Adverse tax opinions or events affecting the tax-exempt status of the security
- Modification of rights of security holders
- Defeasances
- Bond Calls
- Rating Changes
- Release, substitution, or sale of property securing repayment of the securities
- Failure to provide annual financial information
- Other material event notice (specify)

Test Issue: _____, Series 2000B, $75,000,000, DAC

Material Event Notices

| Event Type | Cusip Number | View | Delete | Send To NRMSIRS |
|---|---|---|---|---|
| | | | | |

1200

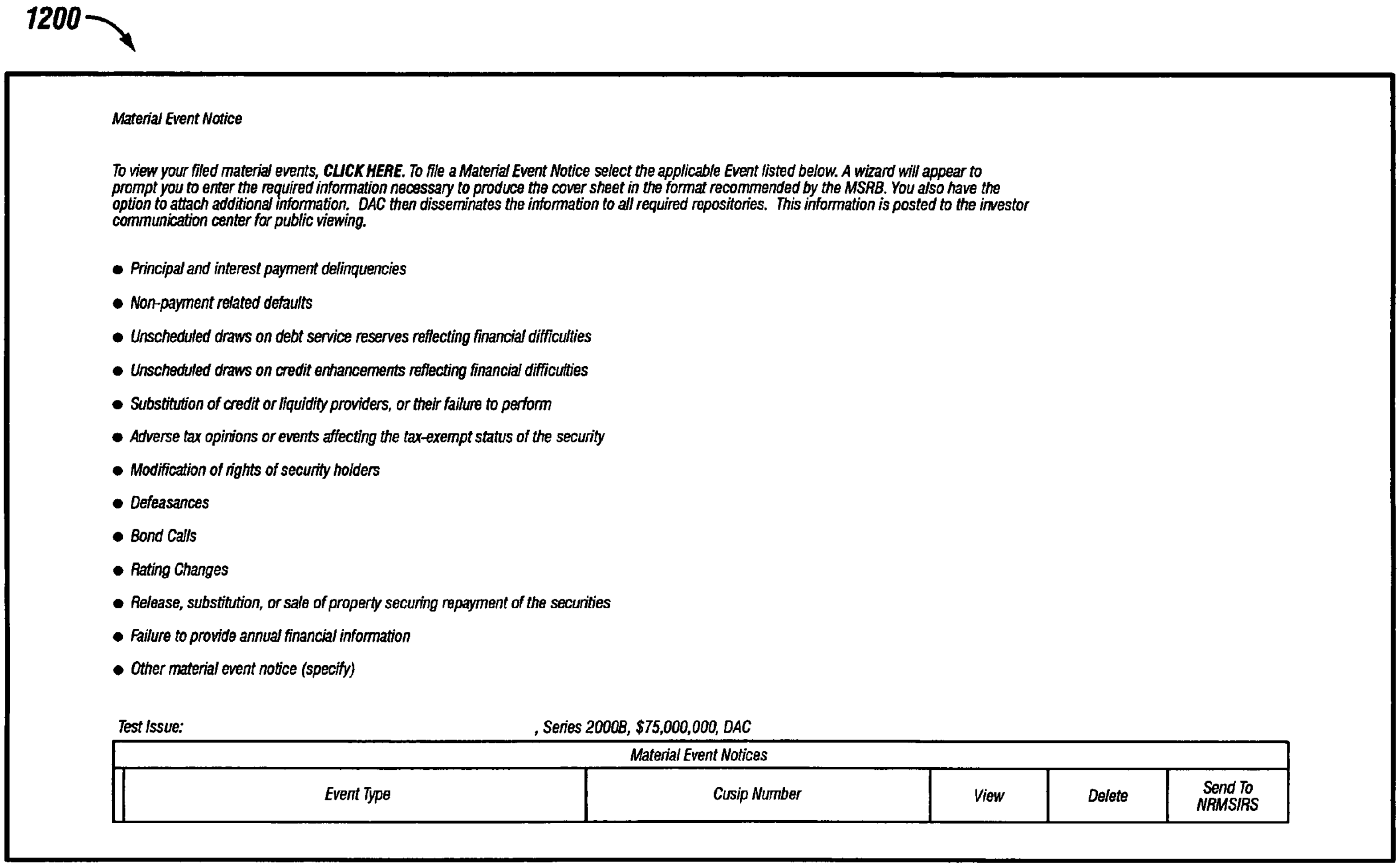

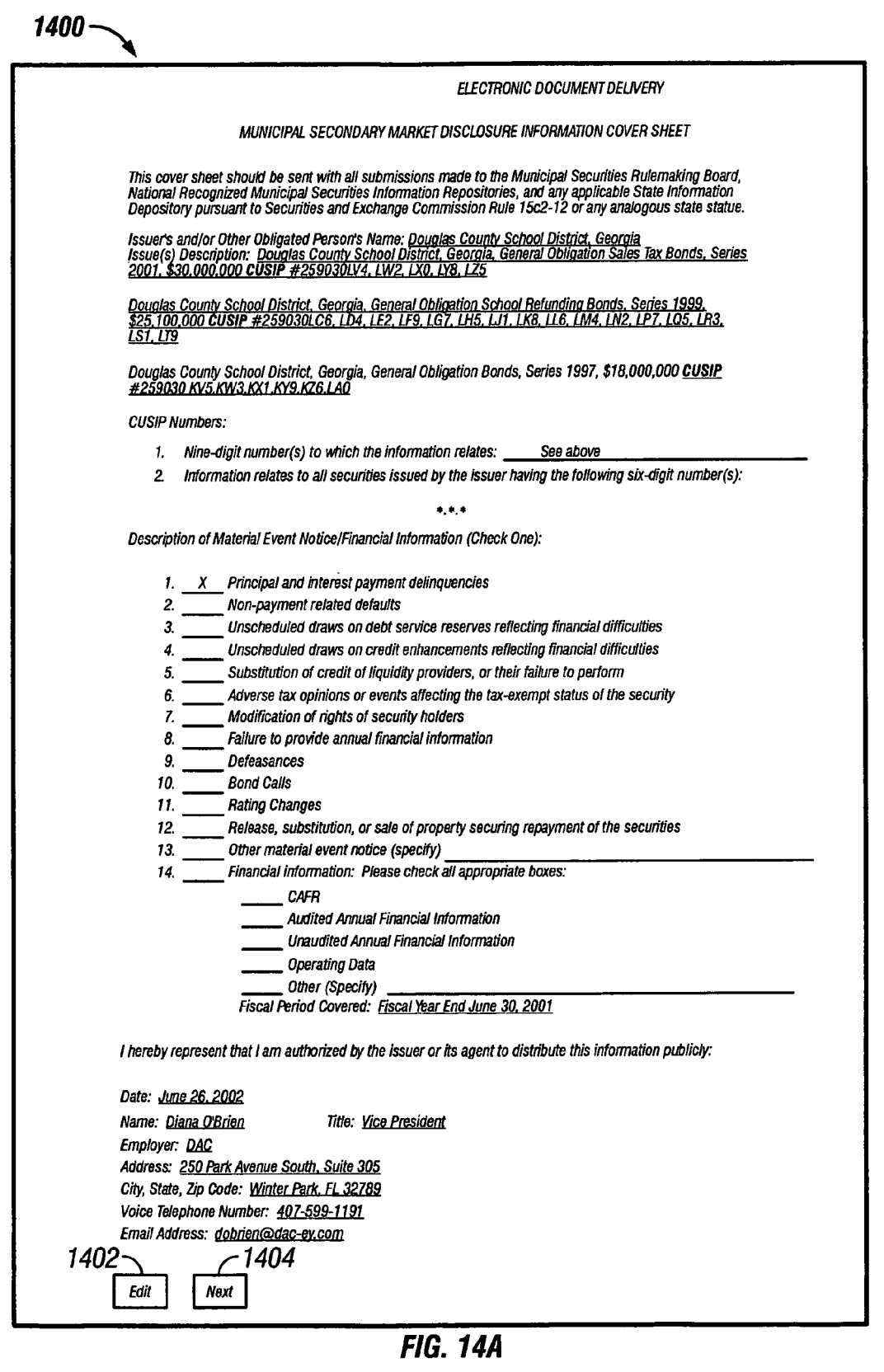

ELECTRONIC DOCUMENT DELIVERY

MUNICIPAL SECONDARY MARKET DISCLOSURE INFORMATION COVER SHEET

This cover sheet should be sent with all submissions made to the Municipal Securities Rulemaking Board, National Recognized Municipal Securities Information Repositories, and any applicable State Information Depository pursuant to Securities and Exchange Commission Rule 15c2-12 or any analogous state statue.

Issuer's and/or Other Obligated Person's Name: Douglas County School District, Georgia
Issue(s) Description: Douglas County School District, Georgia, General Obligation Sales Tax Bonds, Series 2001, $30,000,000 CUSIP #259030LV4, LW2, LX0, LY8, LZ5

Douglas County School District, Georgia, General Obligation School Refunding Bonds, Series 1999, $25,100,000 CUSIP #259030LC6, LD4, LE2, LF9, LG7, LH5, LJ1, LK8, LL6, LM4, LN2, LP7, LQ5, LR3, LS1, LT9

Douglas County School District, Georgia, General Obligation Bonds, Series 1997, $18,000,000 CUSIP #259030 KV5,KW3,KX1,KY9,KZ6,LA0

CUSIP Numbers:

1. Nine-digit number(s) to which the information relates: See above
2. Information relates to all securities issued by the issuer having the following six-digit number(s):

*.*.*

Description of Material Event Notice/Financial Information (Check One):

1. X Principal and interest payment delinquencies
2. ___ Non-payment related defaults
3. ___ Unscheduled draws on debt service reserves reflecting financial difficulties
4. ___ Unscheduled draws on credit enhancements reflecting financial difficulties
5. ___ Substitution of credit of liquidity providers, or their failure to perform
6. ___ Adverse tax opinions or events affecting the tax-exempt status of the security
7. ___ Modification of rights of security holders
8. ___ Failure to provide annual financial information
9. ___ Defeasances
10. ___ Bond Calls
11. ___ Rating Changes
12. ___ Release, substitution, or sale of property securing repayment of the securities
13. ___ Other material event notice (specify) ___
14. ___ Financial information: Please check all appropriate boxes:
    - ___ CAFR
    - ___ Audited Annual Financial Information
    - ___ Unaudited Annual Financial Information
    - ___ Operating Data
    - ___ Other (Specify) ___

Fiscal Period Covered: Fiscal Year End June 30, 2001

I hereby represent that I am authorized by the issuer or its agent to distribute this information publicly:

Date: June 26, 2002
Name: Diana O'Brien Title: Vice President
Employer: DAC
Address: 250 Park Avenue South, Suite 305
City, State, Zip Code: Winter Park, FL 32789
Voice Telephone Number: 407-599-1191
Email Address: dobrien@dac-ey.com 1402 1404

Edit Next

FIG. 14A

Material Event Notice

To view filed material events, CLICK HERE. To file a Material Event Notice select the applicable Event listed below. A wizard will appear to prompt you to enter the required information necessary to produce the cover sheet in the format recommended by the MSRB. You also have the option to attach additional information. DAC then disseminates the information to all required repositories. This information is posted to the investor communication center for public viewing.

- Principal and interest payment delinquencies
- Non-payment related defaults
- Unscheduled draws on debt service reserves reflecting financial difficulties
- Unscheduled draws on credit enhancements reflecting financial difficulties
- Substitution of credit or liquidity providers, or their failure to perform
- Adverse tax opinions or events affecting the tax-exempt status of the security
- Modification of rights of security holders
- Defeasances
- Bond Calls
- Rating Changes
- Release, substitution, or sale of property securing repayment of the securities
- Failure to provide annual financial information
- Other material event notice (specify)

Test Issue: , Series 2000B, $75,000,000, DAC

| | Material Event Notices | | | |
|---|---|---|---|---|
| Event Type | Cusip Number | View | Delete | Send To NRMSIRS |
| 1. Principal and interest payment delinquencies | 11133PDM3, DS8, DT9, DW0 | | | |

1450

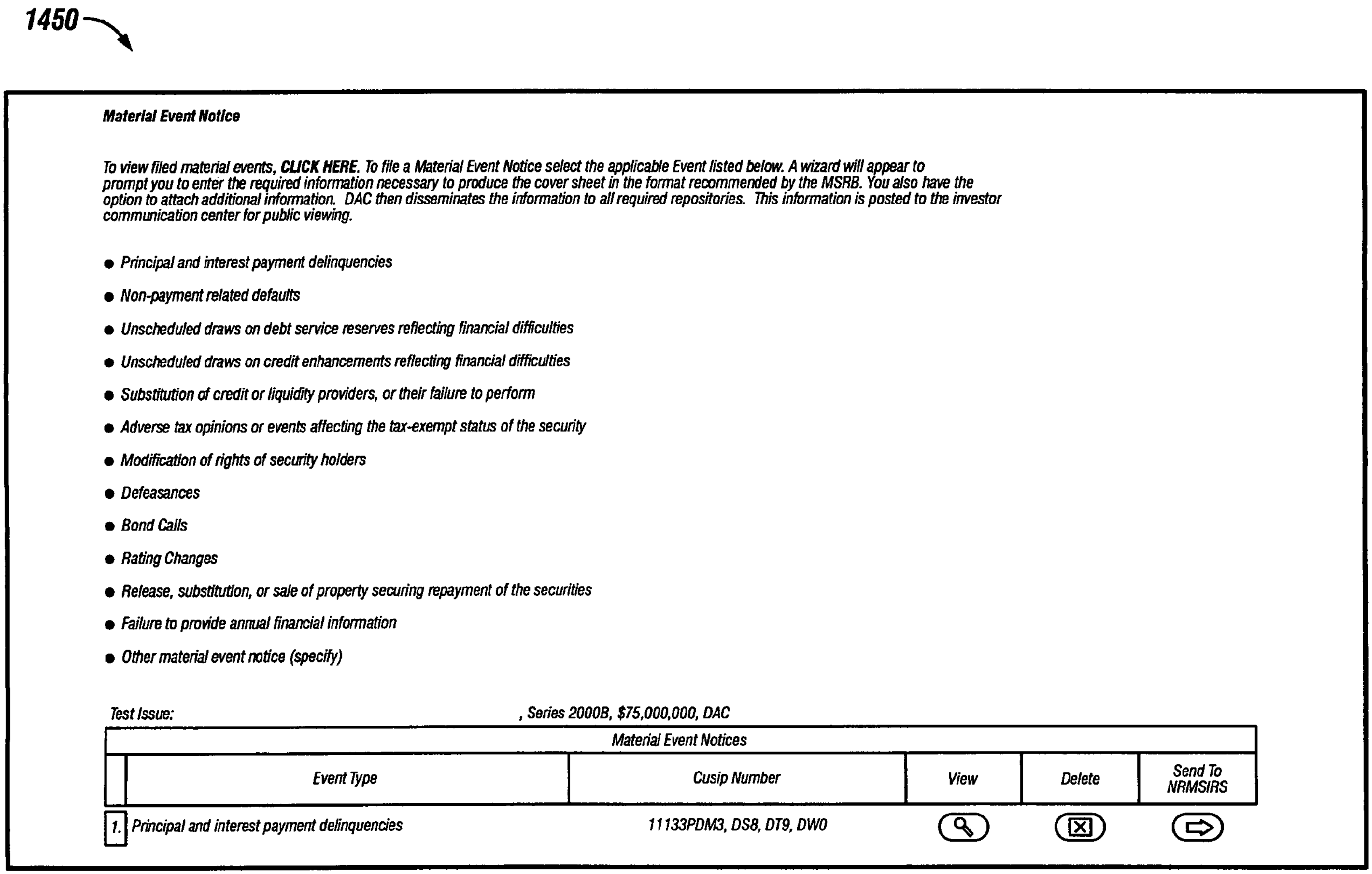

FIG. 14B

2100 platform

▷ issuer
   messaging

▷ conference
   calling

▷ disclosure
   library

▷ about
   compliance
   reporting

▷ SEC letter/
   corresponding
   CDA

Advanced Search                                                General Search

Click General Search for additional search fields.

Fill in one or more of the fields below:

CUSIP 9 digit:

CUSIP 6 digit:

Issuer:

Obligor:

Issue Description:

City:

County:

State: [N/A ▼]

2102 — [ Search ]

Material Event Notice     Friday, December 6, 2002

Cooper Health System (The) Healthcare Redevelopment Project Revenue Bonds, Series 1997 $69,400,000

◊ Back to Document List

To view and/or download a document, select the "View" button.
To view PDF files, download Acrobat Reader

Filed Material Event Notices

| Event Type | Date Posted | |
|---|---|---|
| Rating Changes | 09/04/2002 more... | View |
| Other material event notice (specify) | 01/18/2002 more... | View |
| Rating Changes | 06/22/2001 more... | View |

2302

Question regarding the material event notice you have viewed?

2300

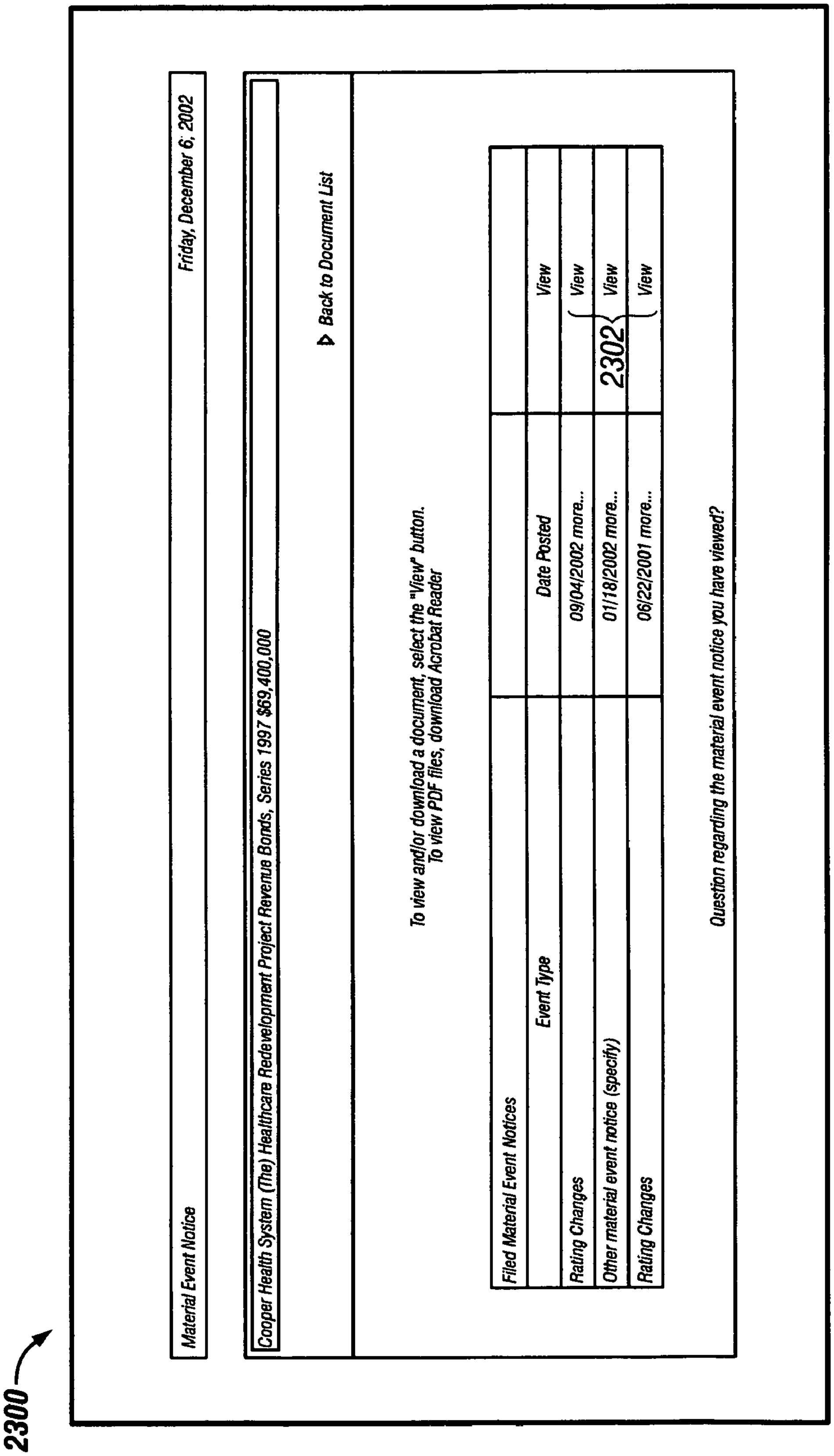

ELECTRONIC DOCUMENT DELIVERY

MUNICIPAL SECONDARY MARKET DISCLOSURE INFORMATION COVER SHEET

This cover sheet should be sent with all submissions made to the Municipal Securities Rulemaking Board, National Recognized Municipal Securities Information Repositories, and any applicable State Information Depository pursuant to Securities and Exchange Commission Rule 15c2-12 or any analogous state statue.

Issuer's and/or Other Obligated Person's Name: <u>Douglas County School District, Georgia</u>
Issue(s) Description: <u>Douglas County School District, Georgia, General Obligation Sales Tax Bonds, Series 2001, $30,000,000 CUSIP #259030LV4, LW2, LX0, LY8, LZ5</u>

<u>Douglas County School District, Georgia, General Obligation School Refunding Bonds, Series 1999, $25,100,000 CUSIP #259030LC6, LD4, LE2, LF9, LG7, LH5, LJ1, LK8, LL6, LM4, LN2, LP7, LQ5, LR3, LS1, LT9</u>

Douglas County School District, Georgia, General Obligation Bonds, Series 1997, $18,000,000 <u>CUSIP #259030 KV5,KW3,KX1,KY9,KZ6,LA0</u>

CUSIP Numbers:

1. Nine-digit number(s) to which the information relates: _____See above_____
2. Information relates to all securities issued by the issuer having the following six-digit number(s):

*.*.*

Description of Material Event Notice/Financial Information (Check One):

1. _____ Principal and interest payment delinquencies
2. _____ Non-payment related defaults
3. _____ Unscheduled draws on debt service reserves reflecting financial difficulties
4. _____ Unscheduled draws on credit enhancements reflecting financial difficulties
5. _____ Substitution of credit of liquidity providers, or their failure to perform
6. _____ Adverse tax opinions or events affecting the tax-exempt status of the security
7. _____ Modification of rights of security holders
8. _____ Failure to provide annual financial information
9. _____ Defeasances
10. _____ Bond Calls
11. _____ Rating Changes
12. _____ Release, substitution, or sale of property securing repayment of the securities
13. _____ Other material event notice (specify) _____
14. __X__ Financial information: Please check all appropriate boxes:
    _____ CAFR
    __X__ Audited Annual Financial Information
    _____ Unaudited Annual Financial Information
    __X__ Operating Data
    _____ Other (Specify) _____
    Fiscal Period Covered: <u>Fiscal Year End June 30, 2001</u>

I hereby represent that I am authorized by the issuer or its agent to distribute this information publicly:

Date: <u>June 26, 2002</u>
Name: <u>Diana O'Brien</u>          Title: <u>Vice President</u>
Employer: <u>DAC</u>
Address: <u>250 Park Avenue South, Suite 305</u>
City, State, Zip Code: <u>Winter Park, FL 32789</u>
Voice Telephone Number: <u>407-599-1191</u>
Email Address: <u>dobrien@dac-ey.com</u>

FIG. 24 search by cusip

[Search]

cusip unknown?

△ continuing disclosure
△ material event notice
△ investor messaging
△ conference calling
△ about compliance reporting
△ disclosure library Continuing Disclosure DAC Test Series 2001                                                                CUSIP # 252525

To view information in the format the file was originally created in, you may select the "Native" button. Should you not have the application required to view the information in the native format, you may select the "HTML" button which enables you to view the information with your Web Browser.

Audited Financial Statements

| Format | Date Submitted | Date Due | Click To View |
|--------|----------------|----------|---------------|
| HTML | N/A | 10/28/1999 | N/A |
| NATIVE | 10/19/2001 | 10/28/1999 | [Native] |

Audited Financial Statements

| Format | Date Submitted | Date Due | Click To View |
|--------|----------------|----------|---------------|
| HTML | N/A | 10/28/1999 | N/A |
| NATIVE | 10/19/2001 | 10/28/1999 | [Native] ~2502 |

Questions regarding the Continuing Disclosure Information you have viewed?

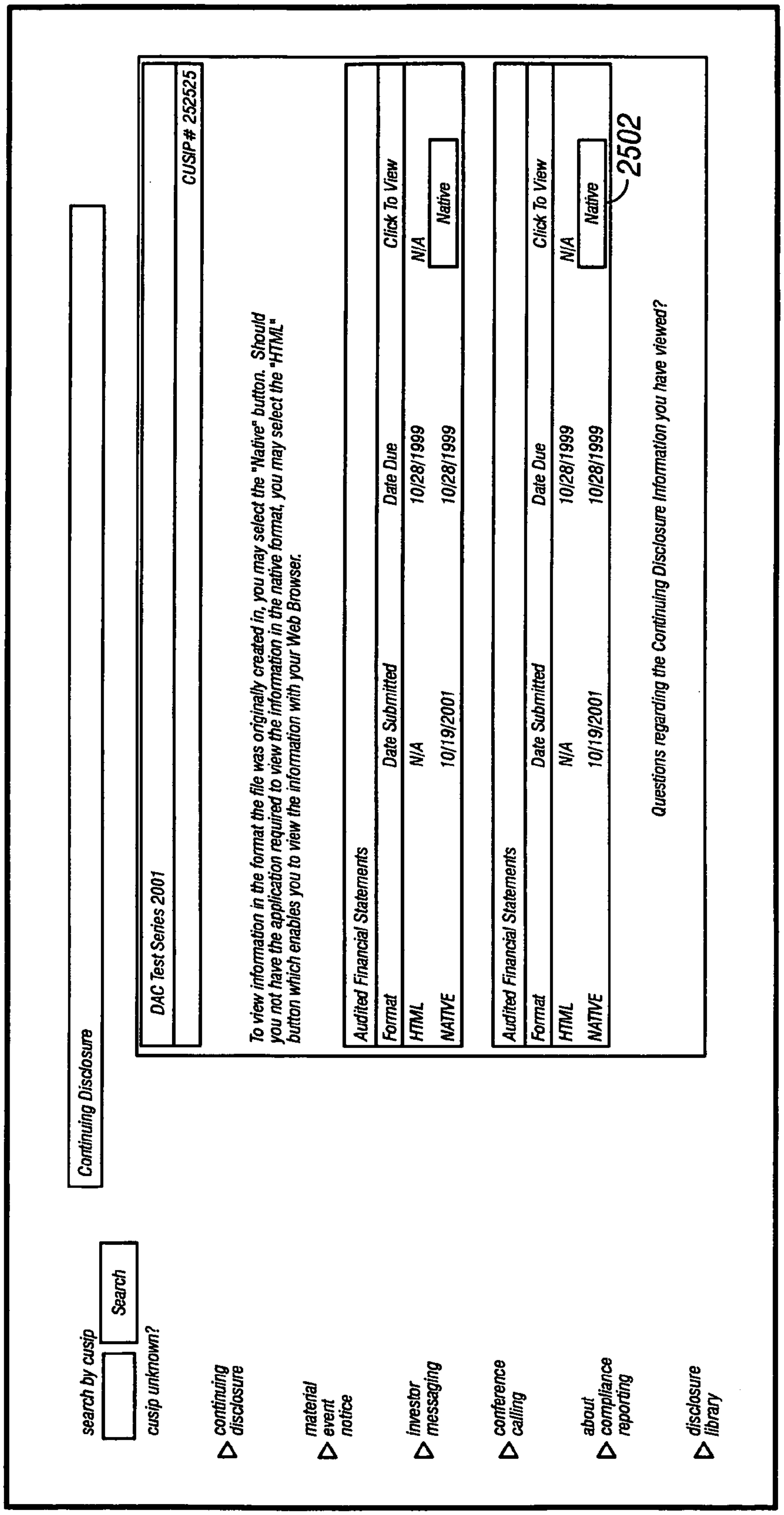

FIG. 25

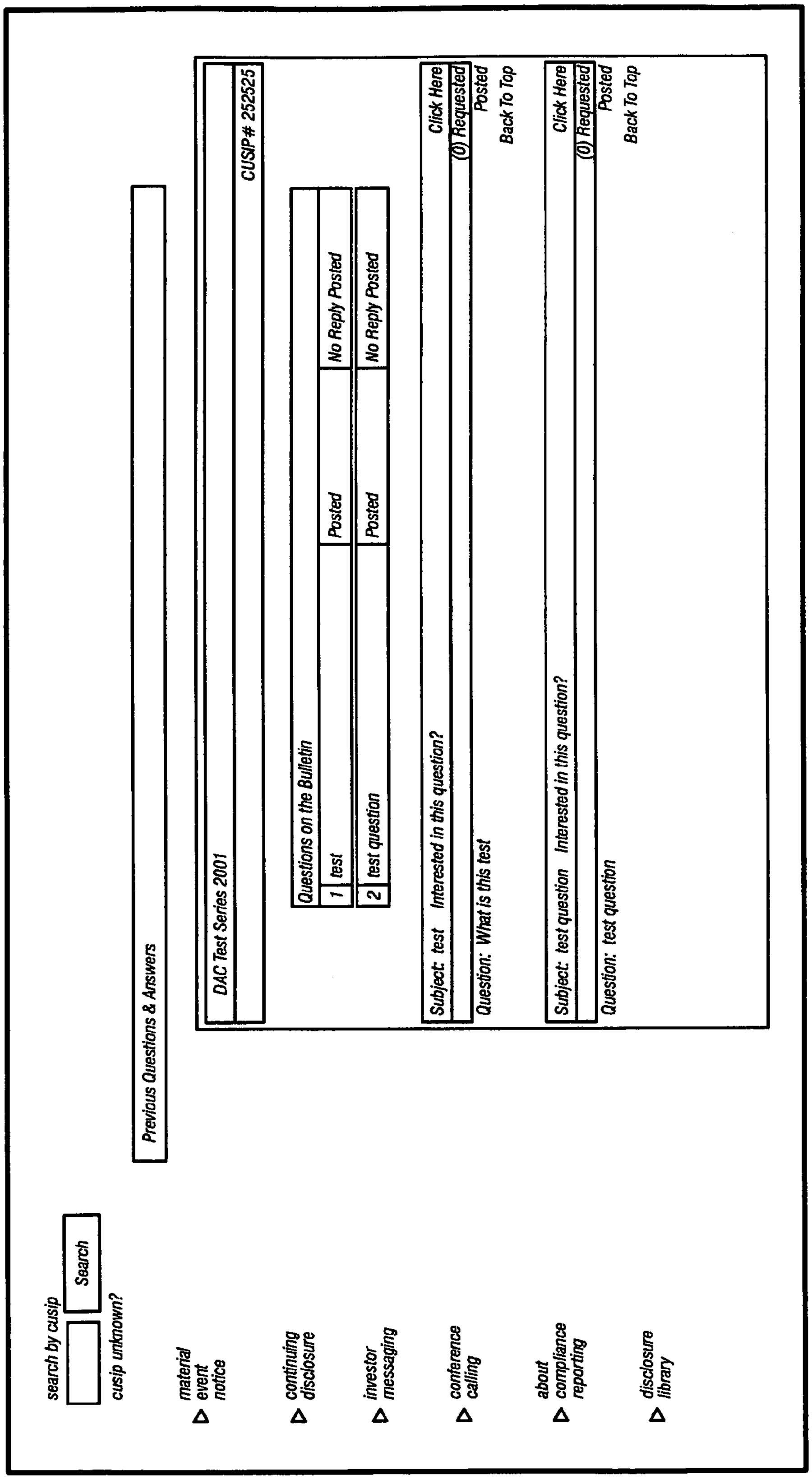

FIG. 27

2700 search by cusip
[Search]
cusip unknown?

△ material
  event
  notice

△ continuing
  disclosure

△ investor
  messaging

△ conference
  calling

△ about
  compliance
  reporting

△ disclosure
  library

Previous Questions & Answers

DAC Test Series 2001                                CUSIP # 252525

| Questions on the Bulletin | | |
|---|---|---|
| 1 | test | Posted | No Reply Posted |
| 2 | test question | Posted | No Reply Posted |

Subject: test    Interested in this question?    Click Here
                                                  (0) Requested
                                                  Posted
Question: What is this test                       Back To Top Subject: test question    Interested in this question?    Click Here
                                                          (0) Requested
                                                          Posted
Question: test question                                   Back To Top

METHOD AND APPARATUS FOR MANAGING INFORMATION AND COMMUNICATIONS RELATED TO MUNICIPAL BONDS AND OTHER SECURITIES

CROSS-REFERENCE TO RELATED APPLICATIONS

This application claims priority to U.S. Provisional Patent Application Ser. No. 60/375,546, filed Apr. 25, 2002.

BACKGROUND OF THE INVENTION

1. Technical Field

The present invention relates generally to a method and apparatus for managing bonds. More specifically, the present invention accepts initial information about a municipal bond as well as subsequent information about the bond that is required to be disclosed. The present invention also makes this information available to regulated entities required to access the information, to central locations designated by regulators to receive the information, to the public and to other entities.

2. Description of the Related Art

The issuance, offer and sale of municipal bonds is regulated by federal securities law. These regulations, in part, mandate brokers and dealers transacting in municipal bonds to have reliable access to disclosed material information concerning the bond issuer's financial condition and operation to require bond issuers to provide these disclosures at the time the bonds are issued, and periodically over the lifetime of the bond. In addition, the issuer must disclose certain important events as they occur.

Traditionally, disclosing this information in a satisfactory and coherent manner was difficult, as was accessing information regarding a municipal bond prior to a broker's recommending it to a customer. For some time, the Securities and Exchange Commission (SEC) has required bond issuers to disclose the above-mentioned information to Nationally Recognized Municipal Securities Information Repositories (NRMSIRs), State Information Depositories ("SIDs"), and disclosure information systems established and operated by the Municipal Securities Rulemaking Board ("MSRB Systems," and, together with NRMSIRs and SIDs "Municipal Disclosure Repositories," referred to herein as MDRs). MDRs were created by the SEC to serve as points where information could be deposited by issuers and retrieved by interested parties. As a means of preventing fraud in the municipal market, Brokers and Dealers (as those terms are legally defined by the SEC) in municipal securities are required to have access to systems, including Municipal Disclosure Repositories that provide reliable information about municipal issuers and their bonds.

Issuers, however, have had difficulty in fully utilizing NRMSIRs, SIDs and MSRB Systems. Some issuers contend that NRMSIRs are not "user friendly," and that there is little feedback when incomplete information is accidentally submitted. Further, NRMSIRs do not affirmatively remind issuers when information is due to be submitted. Brokers and Dealers transacting in municipal bonds have had difficulty in meeting regulatory requirements because of uncertainty over the reliability of information available through NRMSIRs. Specifically, whether information required to be filed was, in fact, received by the NRMSIRs and whether the information was received have been difficult to determine. Brokers and Dealers have complained that the information on file at each of four current NRMSIRs is inconsistent and the SEC staff has noted inconsistent filings among NRMSIRs in sample studies. Also, Issuers cannot verify that their disclosure filings have been received and accurately filed with NRMSIRs, SIDs and MSRB Systems. Brokers and Dealers transacting in municipal bonds cannot easily verify the reliability of Municipal Disclosure Repositories. As a result, Brokers and Dealers transacting in municipal bonds cannot with certainty comply with current regulatory mandates.

Thus, a need exists for a system that reliably indicates whether required information with respect to a municipal bond or similar security has or has not been timely filed. This system should allow for the simple, timely, and reliable submission of bond information as required by the SEC. This system should verify, to the extent possible, that all required information has been filed and is contained within an issuer's submitted bond information. The system should then simultaneously "publish" the information by making it available on the Internet. In addition, the system should send the information on to the NRMSIRs, SIDs and MSRB Systems to fulfill the issuers' legal obligations. The system should provide Brokers and Dealers transacting in a municipal bond reasonable assurance that it will receive prompt notice of any event relating to that municipal bond disclosed pursuant to SEC regulation applicable to municipal securities. The system should provide a secure system for the electronic submission, storage, transmission and retrieval of audited financial statements and other information in conformity with professional standards. The system should also provide a secure means for communication among issuers, their agents, and investors, including by electronic mail and teleconferencing. The system should also periodically remind the issuers when new information about their bonds is due.

SUMMARY OF THE INVENTION

Generally, the present invention is a method and apparatus for gathering information from issuers of municipal securities and distributing information evenly to municipal disclosure repositories, regulatory bodies and the public. A central aspect of the present invention is a computer application, which can be implemented on a computer system that is attached to a network of computers and other communication devices, such as the Internet. Initially, the application accepts the full name description of a particular municipal security issue, together with a unique identifier assigned by CUSIP. The system grants a secured and encrypted password to the issuer enabling the issuer to enter ongoing information about the issue. This information may include annual audits of the issuer, certain operating data, and any event notices deemed material by the issuer. Such information is provided to comply with the contractual obligations of the issuer to the bond holders and to provide Brokers and Dealers with a procedure for meeting regulatory requirements that provide prompt notice of events relating to bonds they recommend to customers. For information that is required to be submitted on a periodic basis, the system determines when the information is due to be submitted, and prompts the issuer to file such information with the system. This information is then published to the public, and, simultaneously, transmitted to the municipal disclosure repositories and/or regulatory bodies via a one-click dissemination system. If the issuer does not submit the required information by the due date, the system files a notice that the required information was not submitted by the issuer. Additionally, the system establishes an audit trail for gathering and the distribution of the information. Another important aspect of the audit includes receiving and archiving a receipt that information was transmitted to the municipal disclosure repositories and/or regulatory body. Finally, the system provides a secure platform for communication among issuers and their investors via electronic mail and teleconferencing.

BRIEF DESCRIPTION OF THE DRAWINGS

The novel features which are believed to be characteristic of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is the main menu presented to an issuer;

FIG. 4 is a form presented by the application in a screen that collects information from an issuer about a new bond;

FIG. 5 is a screen that presents a summary of the information entered in the form shown on the previous screen;

FIG. 9 is a screen from which an issuer begins the process of submitting a disclosure document;

FIG. 10 is a screen from which an issuer continues to enter information for a disclosure document;

FIG. 11 is a screen that confirms the input of the disclosure document (previously entered in screen 1000) and allows information to be transmitted to MDRs;

FIG. 12 is a screen from which an issuer begins the process of submitting an MEN;

FIG. 14A is a screen that shows an e-version of the MSRB coversheet that will be sent to the MDRs;

FIG. 14B is a screen that presents a summary of the MENs that have been submitted and their status;

FIG. 23 is a screen that shows the bond selected in screen 2200;

FIG. 24 is a screen that shows the MSRB coversheet related to a filed MEN;

FIG. 25 is a screen that shows detailed information about disclosure documents associated with the selected bond;

FIG. 27 is a screen that shows replies to emails sent by the visitor, among other email messages.

DETAILED DESCRIPTION OF THE INVENTION

Generally, the present invention is comprised of a computer system and software program that causes the computer system to operate as described below. In a particular embodiment of the present invention, these items function as a web site, and enable municipal bond issuers (issuers) to post information so that the potential buyers and sellers of the issuers' bonds can review the information in order to make informed decisions.

Figure 1:
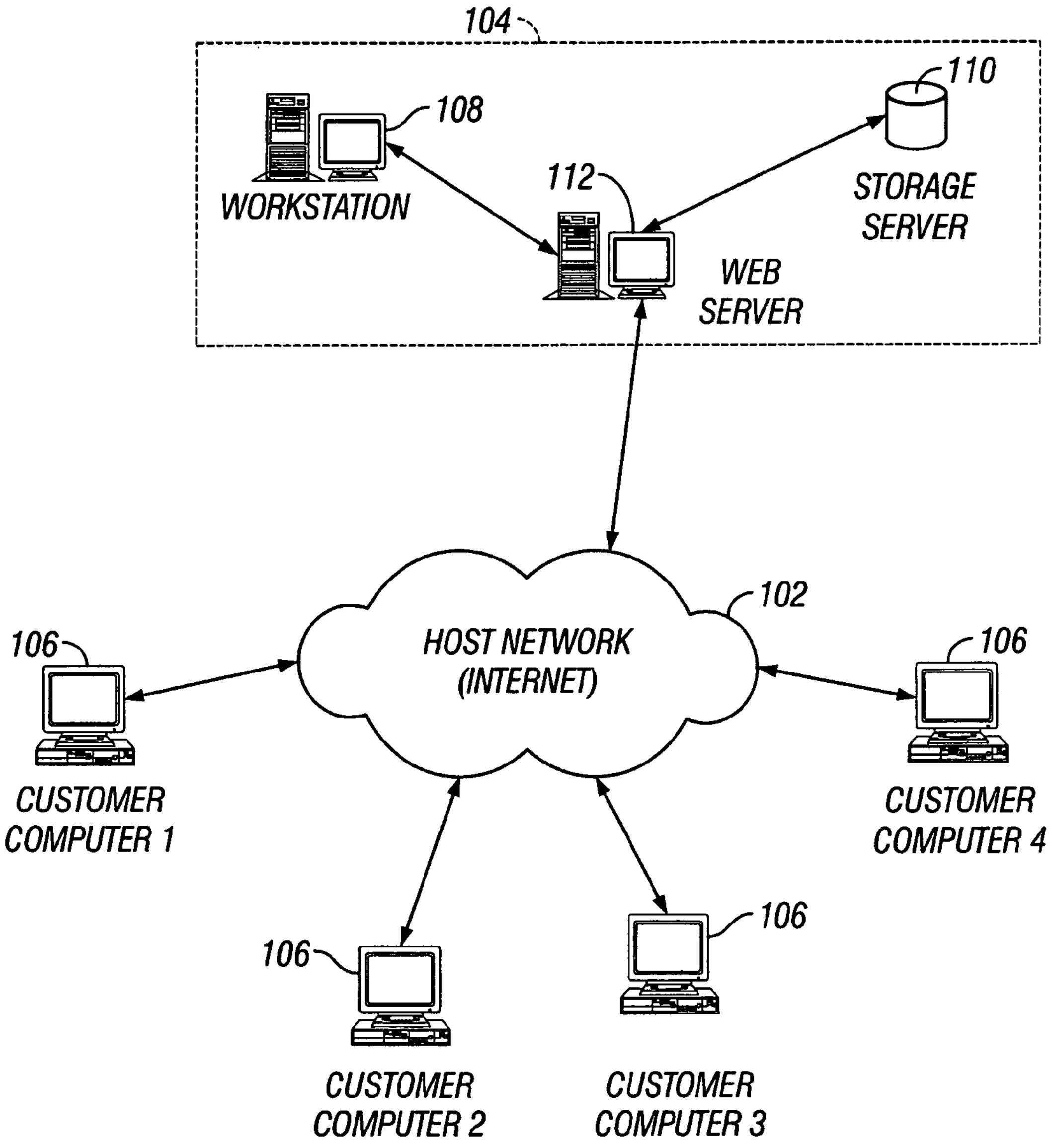
FIG. 1 illustrates a connected network and a series of computers upon which the present invention can be implemented.
Figure 2:
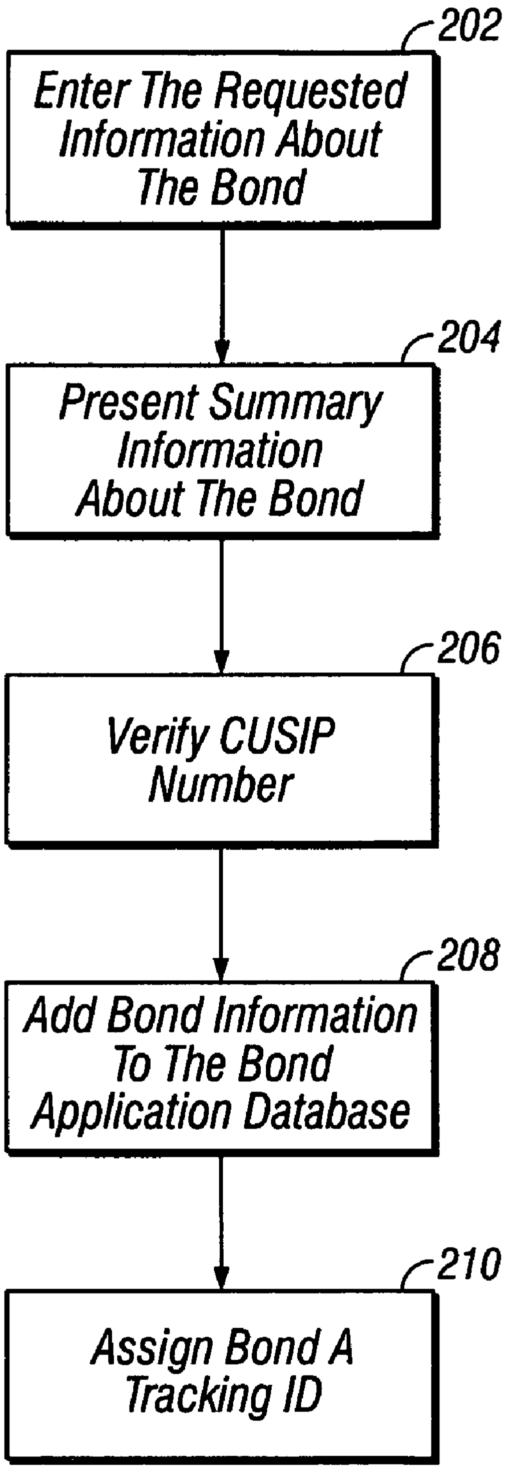
FIG. 2 is a flowchart that shows how an issuer creates an entry for a new bond.

FIG. 1 illustrates a connected network and a series of computers upon which the present invention can be implemented. As illustrated in FIG. 1, host network 102 is a connected network of computers, an example of which is the Internet. Host network 102 can also be implemented by using a private access wide area network (WAN) or any other network. The size of the network is not material to operation of the present invention.

Attached to host network 102 is application server 104. In most implementations, application server 104 is a network of computers that store, access, and process all of the information relating to a number of municipal bonds. As shown in FIG. 1, application server 104 is composed of web server 112 for interacting with host network 102, workstation 108 for executing various programs such as a relational database management program for organizing and indexing information associated with the bonds being tracked by the system, and storage server 110 for providing disk storage for the various data required by web server 112 and workstation 108. This is but one embodiment of application server 104. Depending upon the computational and storage requirements placed on application server 104, application server 104 could be implemented as a single personal computer or a complex of several mainframes. The exact configuration of application server 104 is not material to the present invention, and will undoubtedly vary over time and on the demands placed upon application server 104.

Also connected to host network 102 are customer computers 106. These computers can be implemented using any general-purpose computer configured to transmit and receive information via host network 102. Customer computers 106 can be implemented using personal computers or workstations such as those sold by Dell, Compaq, Sun, Apple and others. These computers often operate under the control of an operating system having a graphical-user interface, and execute a software program that enables customers to request, receive, display and manipulate data from the connected network, examples of which are Microsoft's Internet Explorer and Netscape Navigator. Customer computers 106 allow customers to receive and view screens transmitted from application server 104, and allow customers to transmit information back to application server 104 via host network 102.

Although the description of FIG. 1 contemplates that customer computers 106 will be implemented using traditional personal computers, a variety of other communication devices can be used instead of traditional personal computers. For example, personal digital assistants (PDA's) and cellular phones are now capable of transmitting data to and receiving data from a connected network. Since these devices can transmit data to and receive data from a connected network, they can perform all of the tasks required by customer computers as these computers are used in the present invention. Thus, any device that can transmit data to/receive data from a connected network is, for purposes of the specification and claims, to be considered equivalent to a customer computer.

The following discussion refers to three types of entities: administrators, issuers, and visitors. For the purposes of this disclosure, an administrator is the operator of the web site embodying the invention. An issuer is the entity that has actually issued the bond, or its designated representative. The issuer is responsible for continually submitting information that is related to the bond. For municipal bonds, the issuer will usually be a city, state, or other governmental taxing entity (e.g., a school district). As used herein, an issuer can also be an attorney, underwriter, insurance provider etc. representing the actual issuer of the bond. A distinction will be made between issuers and their attorney, but, otherwise, the term "issuer" applies to both of these entities. A visitor is any person (or entity) seeking information about a bond on the web site.

Some of the figures discussed below are flowcharts that describe methods of operation according to the present invention. Numbers found in parentheses in the following discussion (e.g., (504)) refer to a step in one of the flowcharts. The discussion of the methods shown in the flowcharts is intertwined with discussions of various figures that contain screen images. These screens depict images that appear on a display device of a user accessing a web site operating according to the present invention. The code for these screens is run on the application server and is transmitted via host network to a computer, which displays the code in the form of images and/or text on the computer's display device. When information is entered in a screen, this information is transmitted back to the application server via the connected network.

The software application which operates according to the present invention (the bond application) is designed to be accessed by administrators, issuers, and visitors. Data exchanged between these entities' and the bond application occurs using the secure socket layer protocol or other comparable secure environment. Operating in such a manner ensures that information exchanged with the bond application is authentic, and, in the case of confidential information, is secure.

The discussion below first discusses the bond application from the perspective of the issuer. Then, the application is described from a visitor's perspective.

FIG. 3 shows the screen that is displayed when the issuer logs-in to the bond application. In a preferred embodiment of the present invention, the login is accomplished by the issuer inputting a user name and password. Screen 300 initially presents an overview of the bonds belonging to the person who logged-in to the bond application. If the person logging in is an issuer, a list of all bonds issued by the issuer is presented. On the other hand, if the person logging in is an attorney, all of the bonds being handled by the attorney is displayed. In this particular example, screen 300 shows only a single bond. From screen 300, the issuer can select button 314 to create an entry for a new bond, or the issuer can select from buttons/links 302–312 to take action with respect to a particular bond.

If the issuer selects button 314 from screen 300, form 400, shown in FIG. 4, is displayed on one or more screens. Initially, the issuer completes the information requested in form 400 (202) then selects button 402. Among the information entered by the issuer is the full issue description of the bond. Requiring the full issue description of the bond to be entered makes identifying the bond easier than if ad hoc abbreviations are used for certain words.

The bond application then presents the issuer with screen 500 (FIG. 5). This screen is an overview of the information previously entered by the issuer in form 400. The issuer reviews the information in screen 500 and corrects the information as necessary (204). In one embodiment of the present invention, the information described in form 400 is entered and reviewed, the bond application verifies the CUSIP number (206). Verification of the CUSIP number can be accomplished by cross-referencing the CUSIP (Committee on Uniform Securities Identification Procedures) database, and, assuming it is a valid number, the bond application creates an entry in a database that is used to store the various bonds that are managed by the bond application.

Once the issuer concludes that the information is all correct, the issuer selects button 502 to add the bond to the bond application (208). Once a bond is entered into the bond application, a tracking ID is associated with the bond (210). The tracking ID is a unique ID to track an individual issue. The system will then allow this person to file disclosure documents and material event notices (as will be described below) for the bond.

Figure 6:
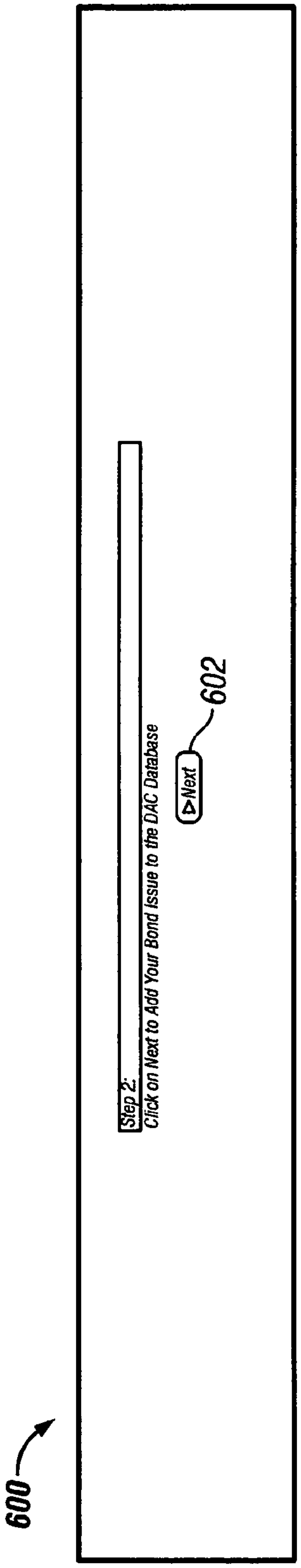
FIG. 6 is a screen that allows the bond to be added to the bond application.
Figure 7:
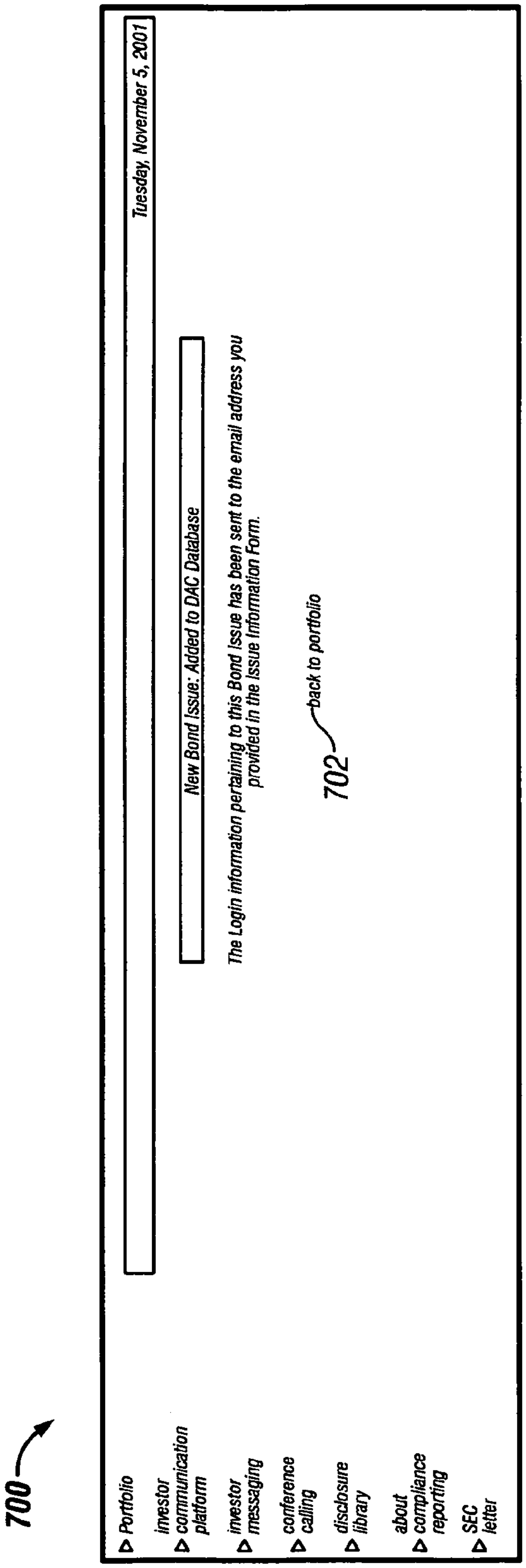
FIG. 7 is a screen that confirms the bond has been successfully entered into the bond application.

After the issuer selects buttons 502 and 602 (FIG. 6), the bond application presents confirmation screen 700 (FIG. 7). This screen confirms that the bond has been successfully logged in to the bond application, and that a confirmation message has been sent to the issuer, bond counsel, and others as specified in form 400. Upon selection of button 702, the issuer is returned to screen 300.

From screen 300, the issuer can select buttons/links 302–312 to manage various aspects of a particular bond. Selection of one of these buttons opens a new window on the issuer's computer system and subsequent screens related to a particular button are presented in that new window.

Figure 8:
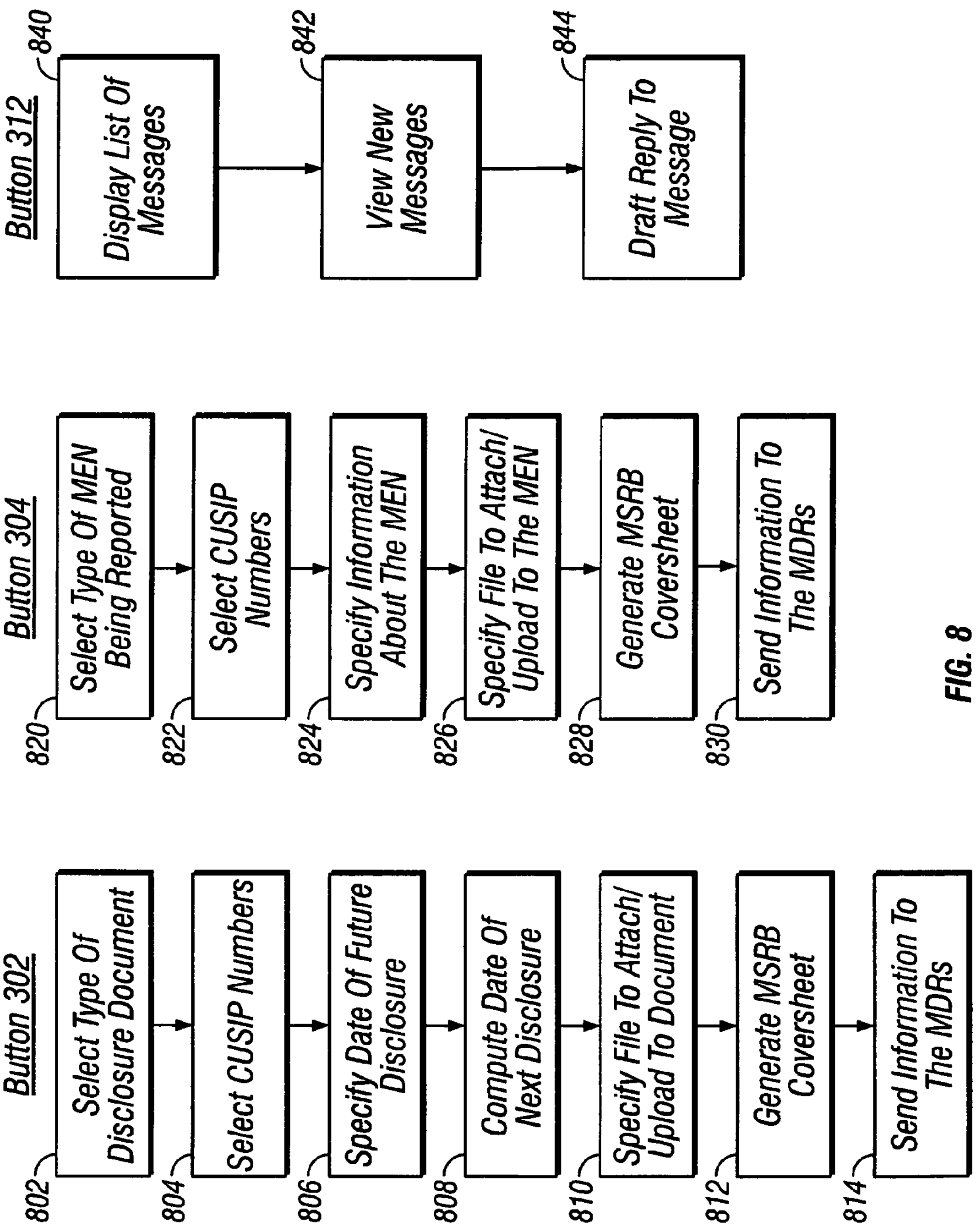
FIG. 8 is a flowchart illustrating some of the options available from screen 300.

Upon selecting button 302, the issuer is taken to screen 900 (FIG. 9). Screen 900 allows the issuer to begin the process of submitting a disclosure document about the financial condition of the issuer. Initially, the issuer selects one of the applicable descriptions 902/906. The selection by the issuer depends on the type of disclosure document the issuer is filing (802) (FIG. 8). The button selected by the issuer depends on whether the issuer is filing a new disclosure document or an amended document (802) (FIG. 8). As shown in screen 900, the issuer is submitting an audited financial statement. If the information being submitted by the issuer is not found in options 904, the issuer may submit custom information by selecting option 906. In addition, in future embodiments, the issuer can specify additional bonds for which the disclosure document will apply by entering their CUSIP number (804). After the proper buttons have been selected, the issuer advances to the next screen in the process by selecting button 908.

Screen 1000 (FIG. 10) is displayed after the issuer selects button 908. From screen 1000, the issuer enters information about the disclosure, and can attach a file as an attachment to support the disclosure. Filing box 1002 allows the issuer to specify how often this type of disclosure document should be filed. Date box 1004 accepts the date of the disclosure, and date box 1006 accepts the fiscal year end. Boxes 1008 accept data that specifies the due date for future disclosures of this type (806). Using the information specified in boxes 1006–1008, the bond application computes the due date for the next disclosure of this type, and will send email reminders at predefined frequency to the issuer that a disclosure is coming due (808).

For example, as shown in screen 1000, the due date for this type of disclosure is shown as being 90 days from the fiscal year end, which is 12/31. Also, this type of disclosure is to be submitted on an annual basis. Thus, at some point before June 30 of the next year, the bond application will send emails to the issuer reminding it that a new disclosure is due. In a preferred embodiment of the present invention, reminders are sent to the issuer 60, 30, 15 and 7 days before the disclosure is due.

If the issuer does not submit the required disclosure information by the due date, the bond application automatically generates a "failure to file notice." A failure to file notice is a notice that a required (SEC Rule 15c2-12) disclosure document for a particular bond was not timely submitted by the issuer. This failure to file notice is made available to the public via the bond application and is also transmitted to the Municipal Disclosure Repositories. As used herein, the term "Municipal Disclosure Repositories" (MDRs) includes Nationally Recognized Municipal Securities Information Repositories (NRMSIRs), State Information Depositories (SIDs), the Municipal Securities Rulemaking Board (MSRB) and any other entity that has been designated as a repository of bond information or is otherwise required to receive such information. In one embodiment of the present invention, a human has to approve the generation and transmission of the failure to file notice. In other embodiments, however, the generation and transmission of such notices can be performed by the bond application without human intervention.

Also in screen 1000, the issuer can choose to upload/attach a file supporting the disclosure (810). These files usually contain more detailed information about the disclosure. The issuer can specify that a certain file be attached to the information by entering the name and location of the file in the box 1010.

After the issuer finishes completing the information shown in screen 1000, the issuer selects button 1012 to advance to screen 1100 (FIG. 11). Screen 1100 is similar to screen 900, except that the disclosure document previously entered in screen 1000 is now shown under status bar 1102. Using the "Delete" icon 1104, the issuer can delete the disclosure document previously entered. On the other hand, if the issuer is satisfied with the information, the issuer can activate "Send to NRMSIRs" icon 1106. In one embodiment of the present invention, an MSRB coversheet accompanies the disclosure information, an example of which is shown in screen 2400. However, the generation of such notices can be performed by the bond application without human intervention (812). Finally, the information will be sent on to the NRMSIRs and other MDRs, and will, simultaneously, be made available to visitors using the bond application, as will be discussed below (814).

Figure 13:
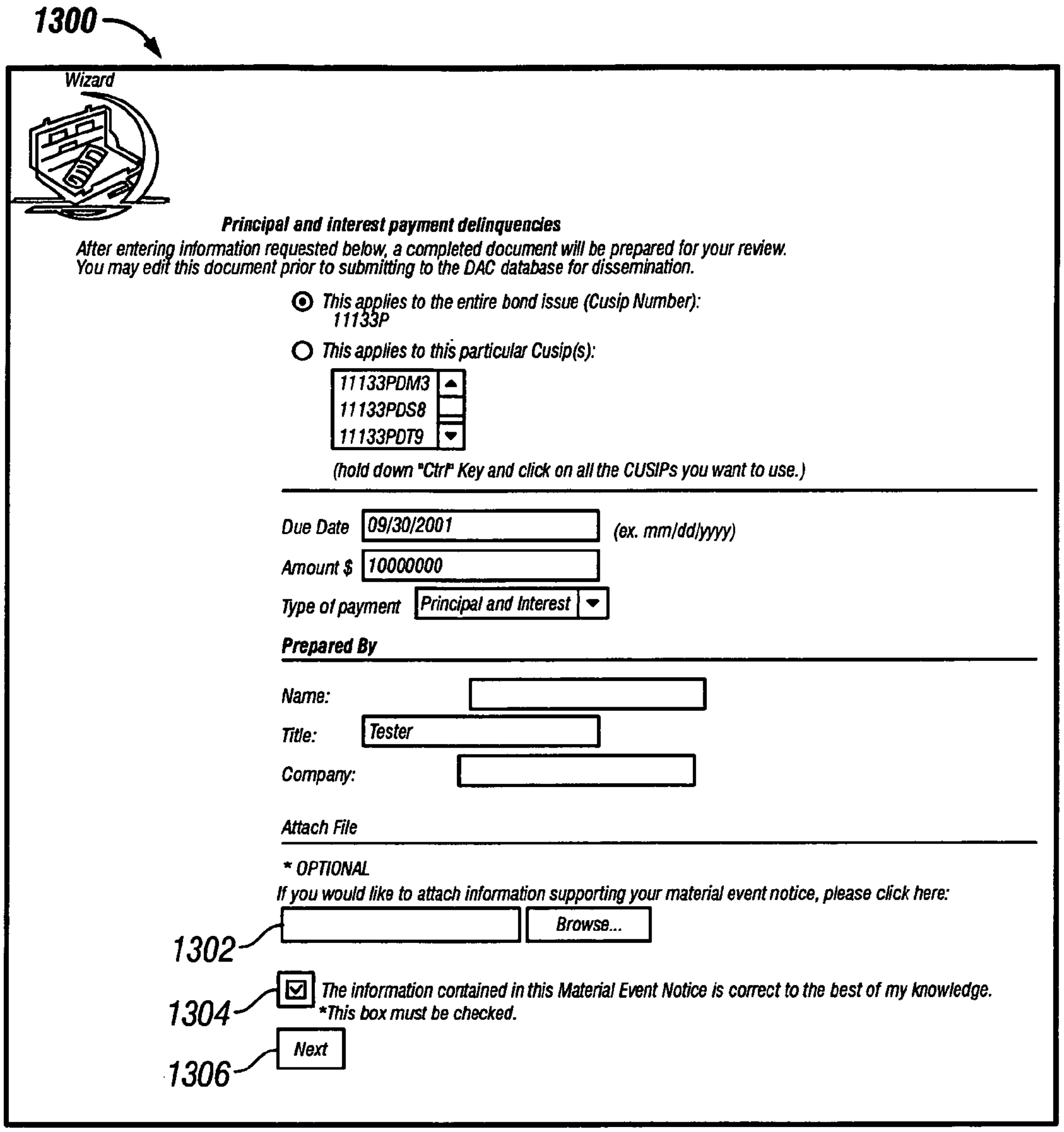
FIG. 13 is a screen from which an issuer continues to enter information about the MEN.

The issuer can select button 304 to submit an MEN (Material Event Notice). Upon selecting button 304, screen 1200 (FIG. 12), is presented to the issuer. Screen 1200 displays a list of the different types of MENs. From this screen, the issuer can select the applicable event the issuer is reporting (820). If none of the options are appropriate, the issuer can select the last option entitled "Other material event notice (specify)" and describe the action. After selecting the "Principal and interest payment delinquencies" option, screen 1300 (FIG. 13) appears. If the issuer had selected one of the other options, a different screen would have appeared. Generally, the various screens simply ask for information related to the event selected in screen 1200. In screen 1300, the issuer can select additional bonds that this MEN is applicable to by specifying their CUSIP numbers (822). In addition, the user is prompted to fill in various boxes with information related to the selection made in screen 1200 (824). The issuer can also specify that a certain file be attached to the information by entering the name and location of the file in box 1302 (826). The issuer has to affirm the accuracy of the information entered in this screen by checking box 1304. When the issuer finishes inputting information into screen 1300, the issuer advances to screen 1400 (FIG. 14A) by selecting button 1306.

Screen 1400 is a summary of the information to be sent to the MDRs regarding the MEN selected in screen 1200 in the form of an MSRB coversheet (828). The issuer reviews this information, then selects button 1402 to edit the information, or button 1404 to save the information and proceed to screen 1450 (FIG. 14B). Screen 1450 shows the various MENs that have been submitted to the bond application and whether the information has been submitted to the MDRs. Selection of button 1452 presents the MEN as it will be (or has been) submitted to the MDRs, while selection of button 1454 allows a particular MEN to be deleted if it has not been submitted to an MDR. Button 1456 will send a particular MEN to the MDRs if it has not been sent already. At the same time the MEN is sent to the MDRs, it is also made available to visitors using the bond application (830).

All documents associated with the bond (e.g., disclosure documents and MENs) are stored by the bond application for the life of the bond or until termination of engagement. In one embodiment of the present invention, a human can publish documents without transmission to the MDRs. In other embodiments, however, publishing without transmission can be performed by the bond application without human intervention.

Figure 15:
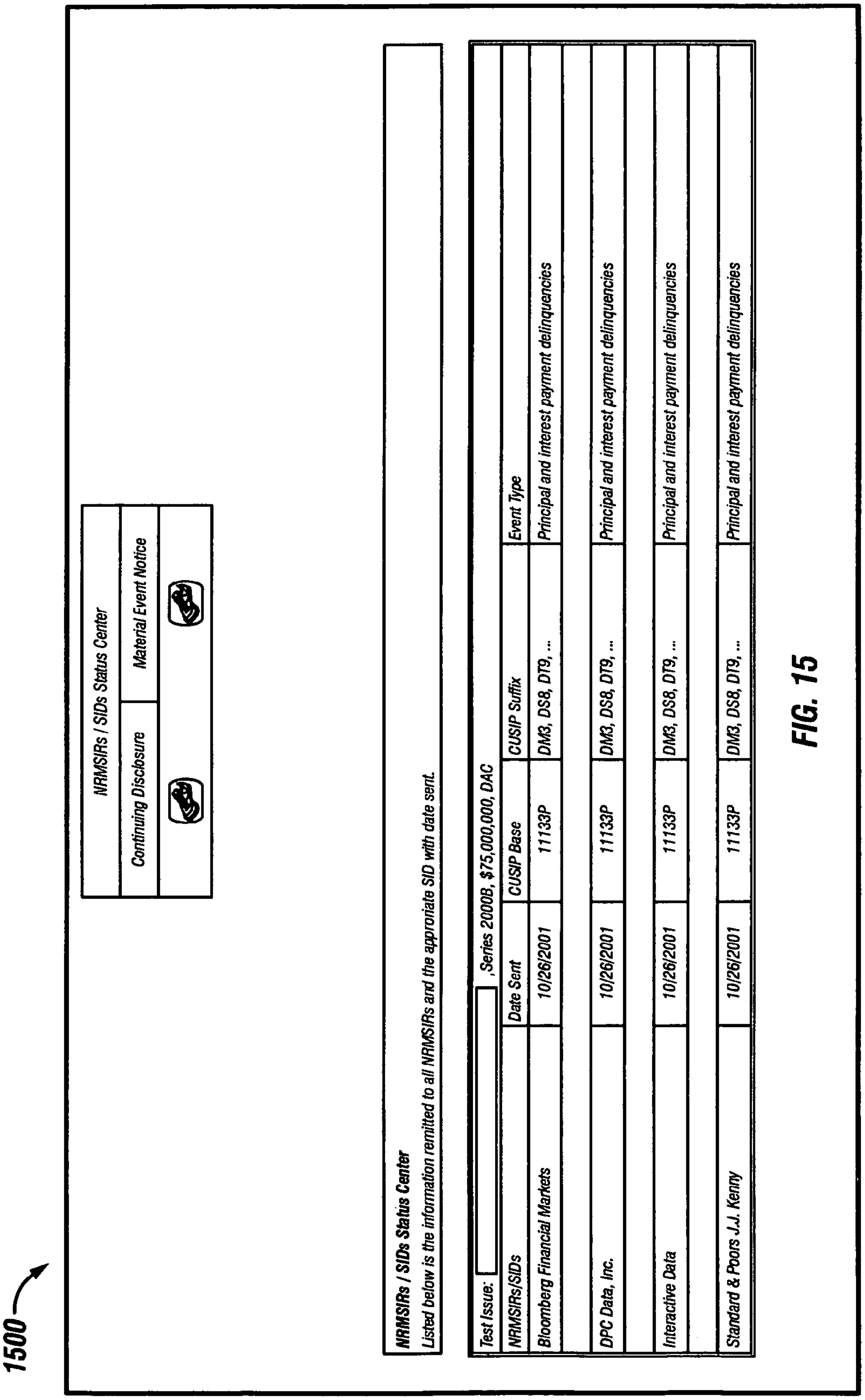
FIG. 15 is a screen showing the various submissions that have been made to NRMSIRs.

The issuer can review all of the information that has been submitted to the MDRs by selecting button 306 from screen 300. Upon selecting this button, screen 1500 (FIG. 15) appears. This screen contains a list of all of the events/information which have been submitted to the MDRs, the particular MDRs to which a particular data item was submitted, the date the information was sent, and the CUSIP number of the bond for which the information was submitted.

After either a disclosure document or an MEN is submitted to the MDRs, the bond application expects to receive a confirmation of receipt from the MDRs to which information was sent. If the expected confirmation is not received, the bond application alerts an operator that certain MDRs failed to receive information transmitted to them. Otherwise, the application posts an e-receipt confirming delivery of the information to the MDRs with a date/time stamp.

Selection of link 310 allows the issuer to request a conference call about the bond. Upon selection of link 310, a screen is displayed that allows the issuer to specify the time of the call This information, along with the phone number to call and the option to listen/participate in the call, is then made available to visitors as described below.

Figure 16:
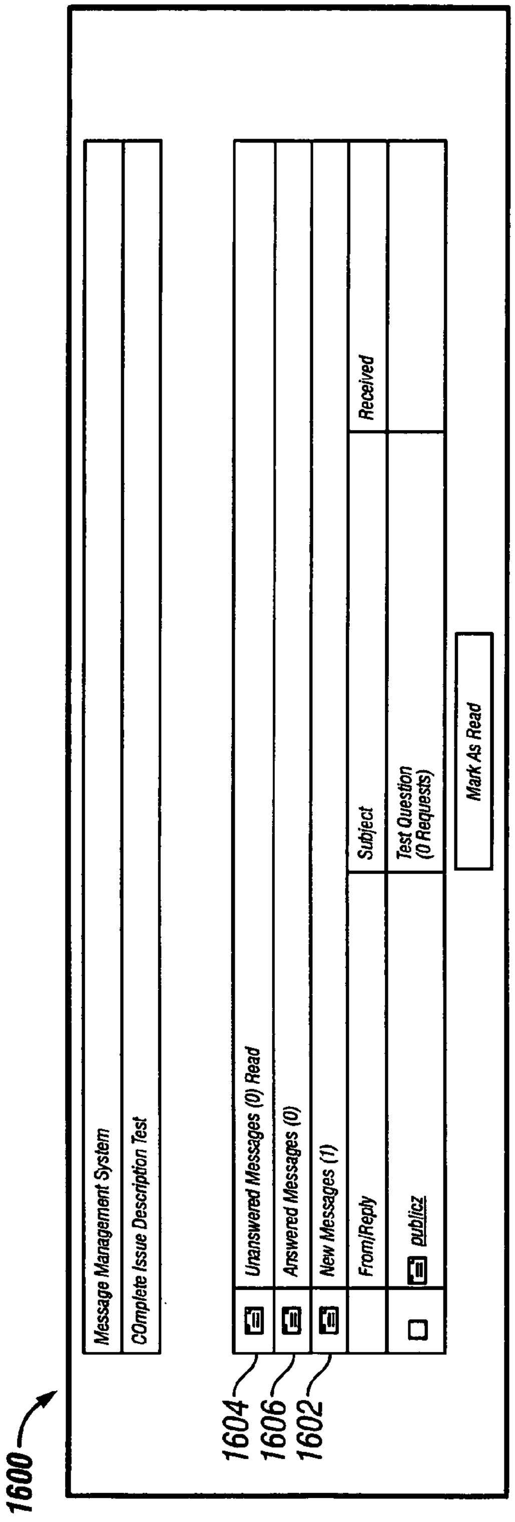
FIG. 16 is a screen that presents a variety of messages to an issuer.
Figure 17:
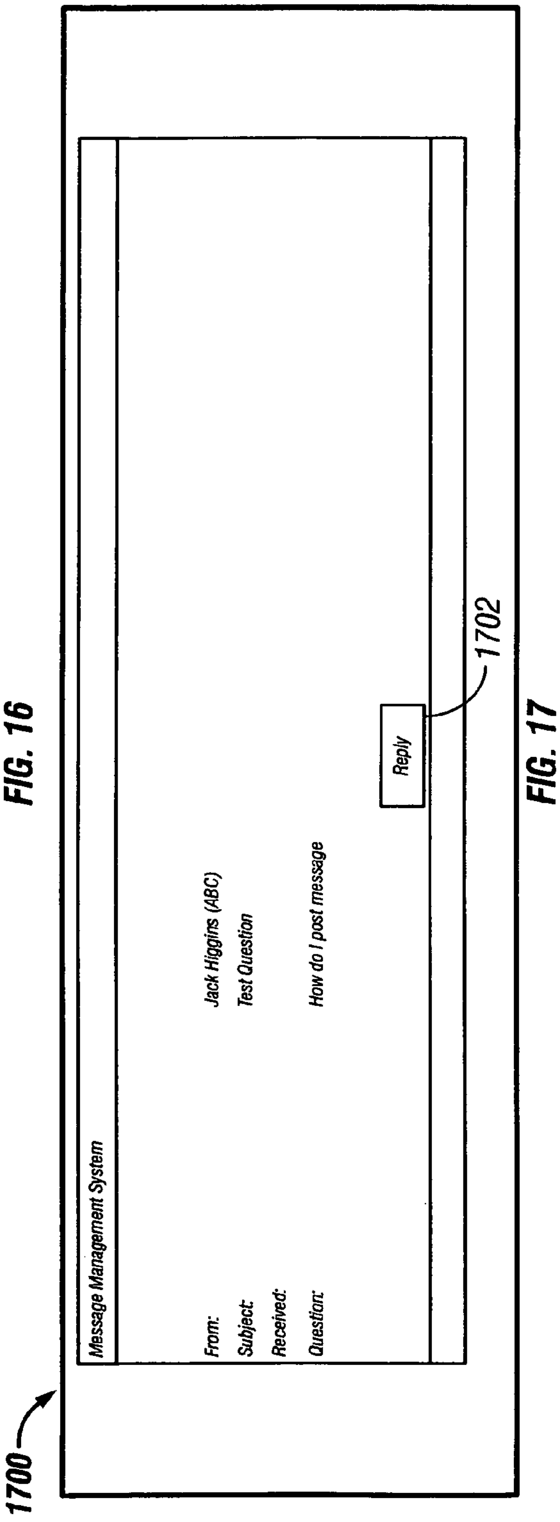
FIG. 17 is a screen from which an issuer can reply to an inquiry.
Figure 19:
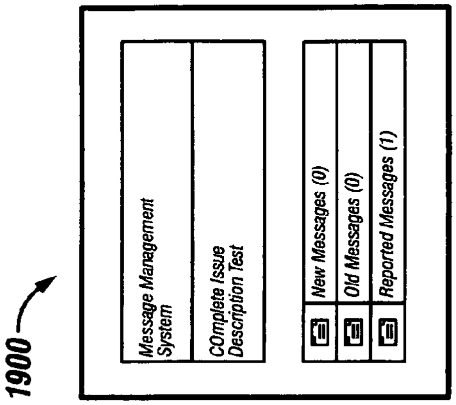
FIG. 19 is a screen that shows the status of an issuer's messages.
Figure 18:
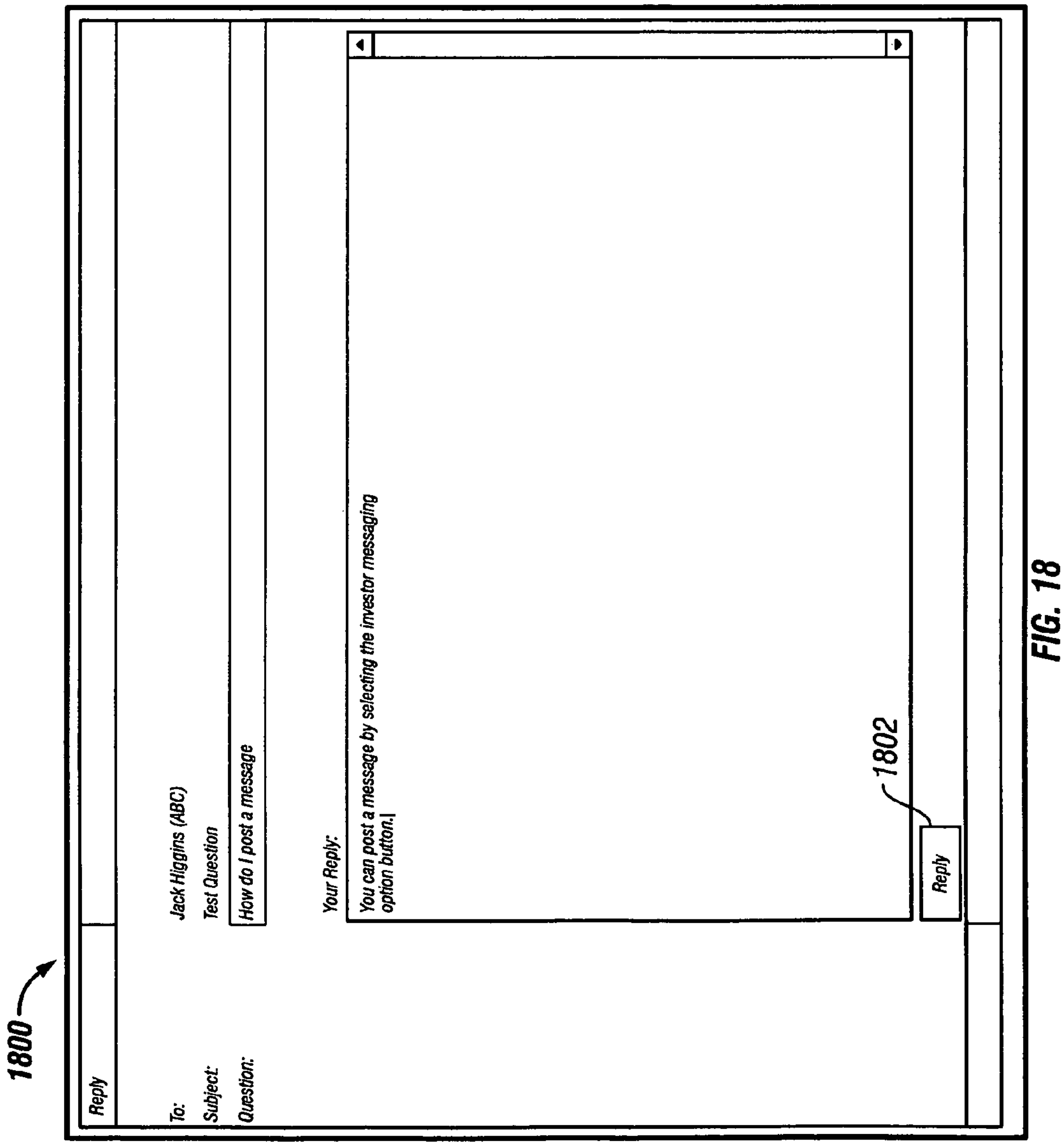
FIG. 18 is a screen from which an issuer can draft a reply to an inquiry.

Another option available from screen 300 is to reply to investor inquiries. As is described below, visitors can ask the issuer questions by posting a message to the web site, as is known in the art and as described in more detail below. By selecting link 312, the issuer can initiate the process of responding to these inquires. After selecting link 312, screen 1600 (FIG. 16) is presented to the issuer. New messages are listed under new message banner 1602. Old messages and replies thereto are noted by old messages indicator 1604 and 1606, respectively (840). To view a new message, the investor selects new mail icon 1602. Selection of this icon displays screen 1700 (FIG. 17). This screen displays the message and gives the issuer a chance to respond (842). To respond to the message, the issuer selects reply button 1702, which, in turn, causes screen 1800 (FIG. 18) to be displayed. From within screen 1800, the issuer drafts a reply to the question contained in the message (844). When the issuer is finished, the issuer selects reply button 1802, whereupon screen 1900 (FIG. 19) is displayed. This screen is similar to screen 1600, but now, no new messages are indicated, while the replied message count (item 1602) is incremented by one. The issuer may review any old message or replies by selecting old messages icon 1604 or 1606, respectively.

Figure 20:
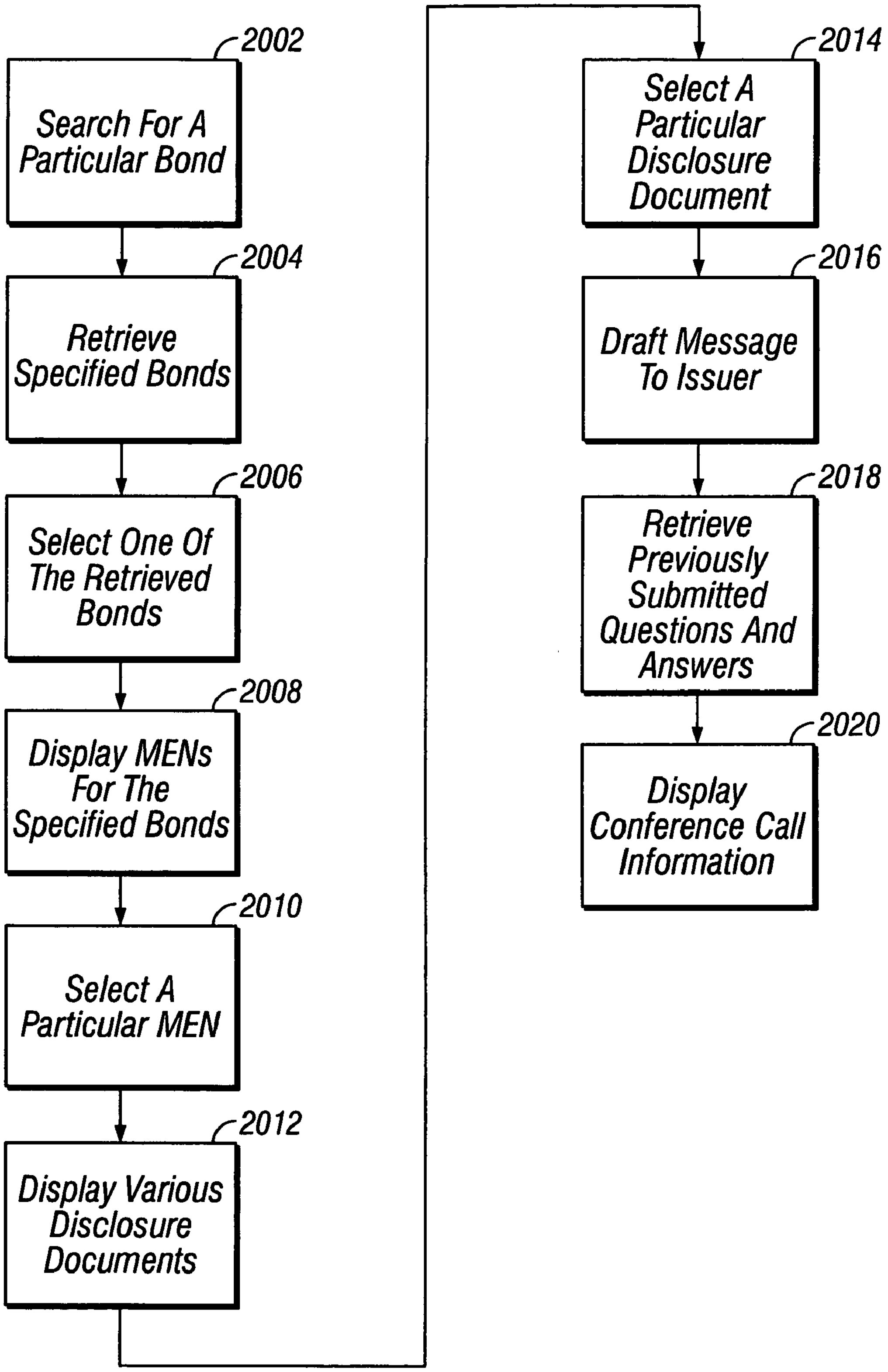
FIG. 20 is a flowchart illustrating a method by which a visitor can search and retrieve information about a bond.
Figure 21:
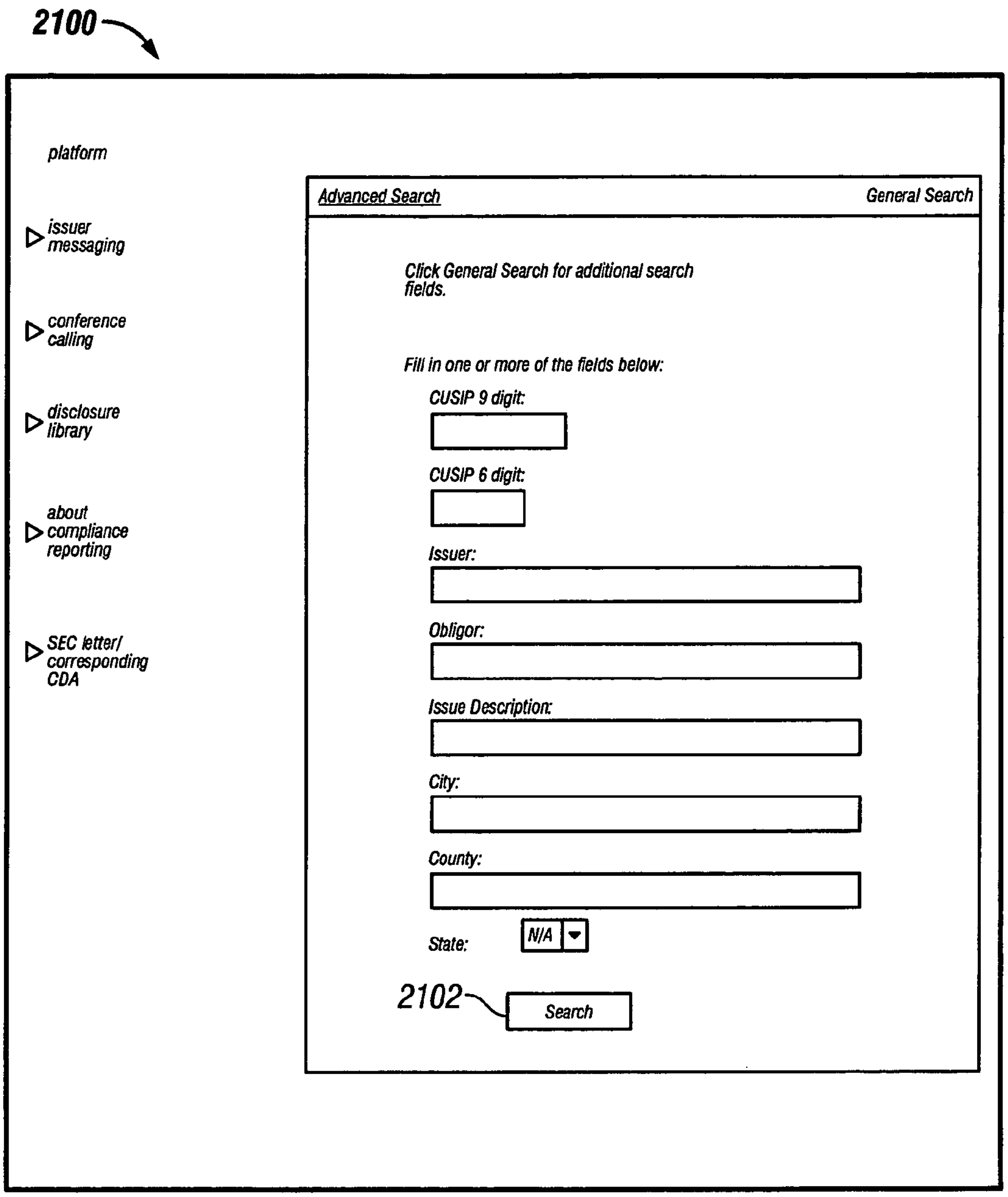
FIG. 21 is a screen from which the visitor can initiate a search.

Turning now to how a visitor interacts with the bond application, the visitor initially logs into the bond application using a password and username provided through the registration process. Once the username and password are accepted, the visitor is presented with screen 2100 (FIG. 21) whereby the visitor can search for various bonds. FIG. 20 contains a flowchart that depicts this process. As shown in screen 2100, the visitor can search for a bond by specifying information in one or more fields as shown in screen 2100 (2002). Although not shown in screen 2100, a search can also be conducted by specifying key words that appear in the bond information. After the search criteria are entered into screen 2100, the visitor initiates the search by selecting button 2102.

Figure 22A:
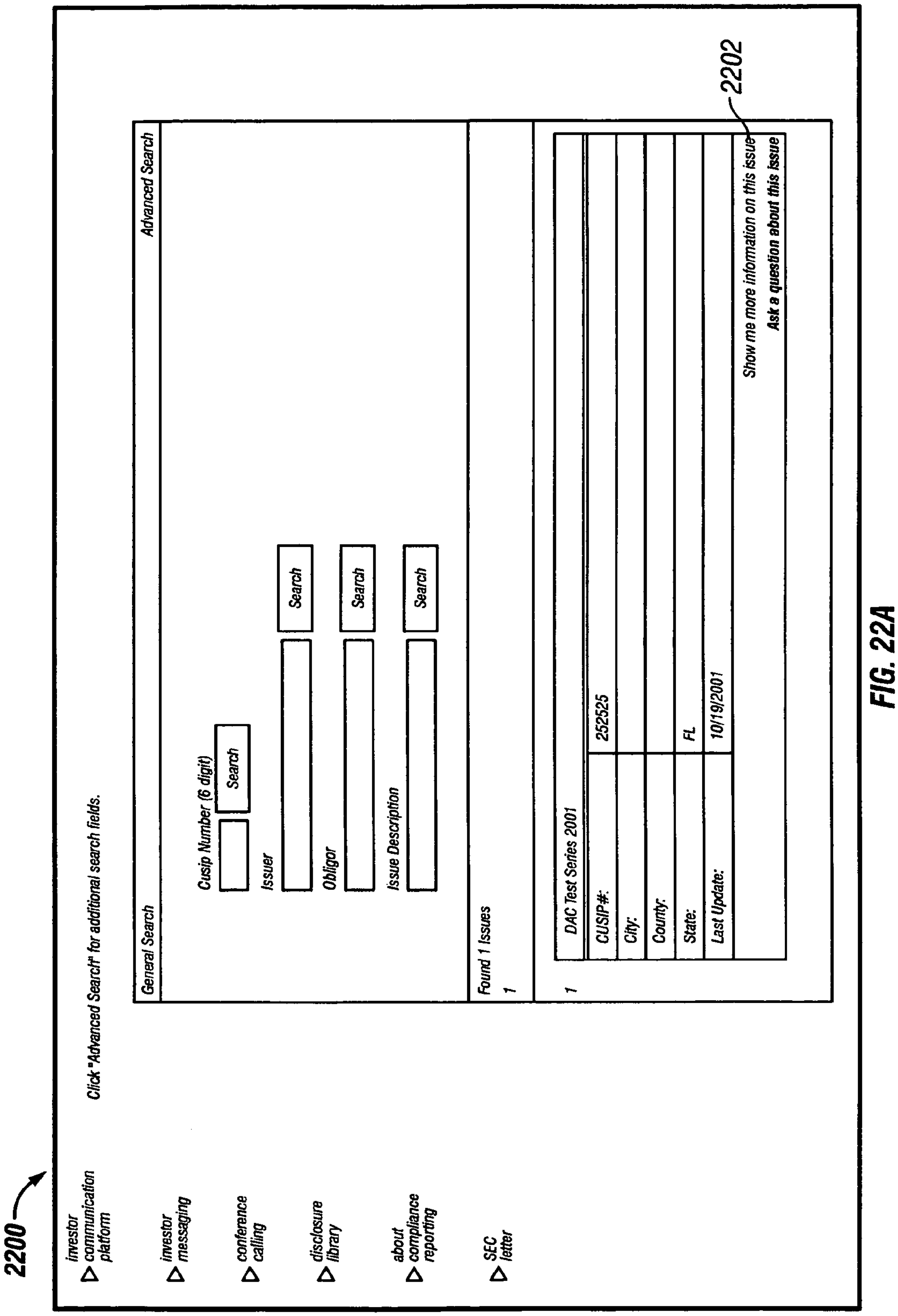
FIG. 22A is a screen showing the search results.
Figure 22B:
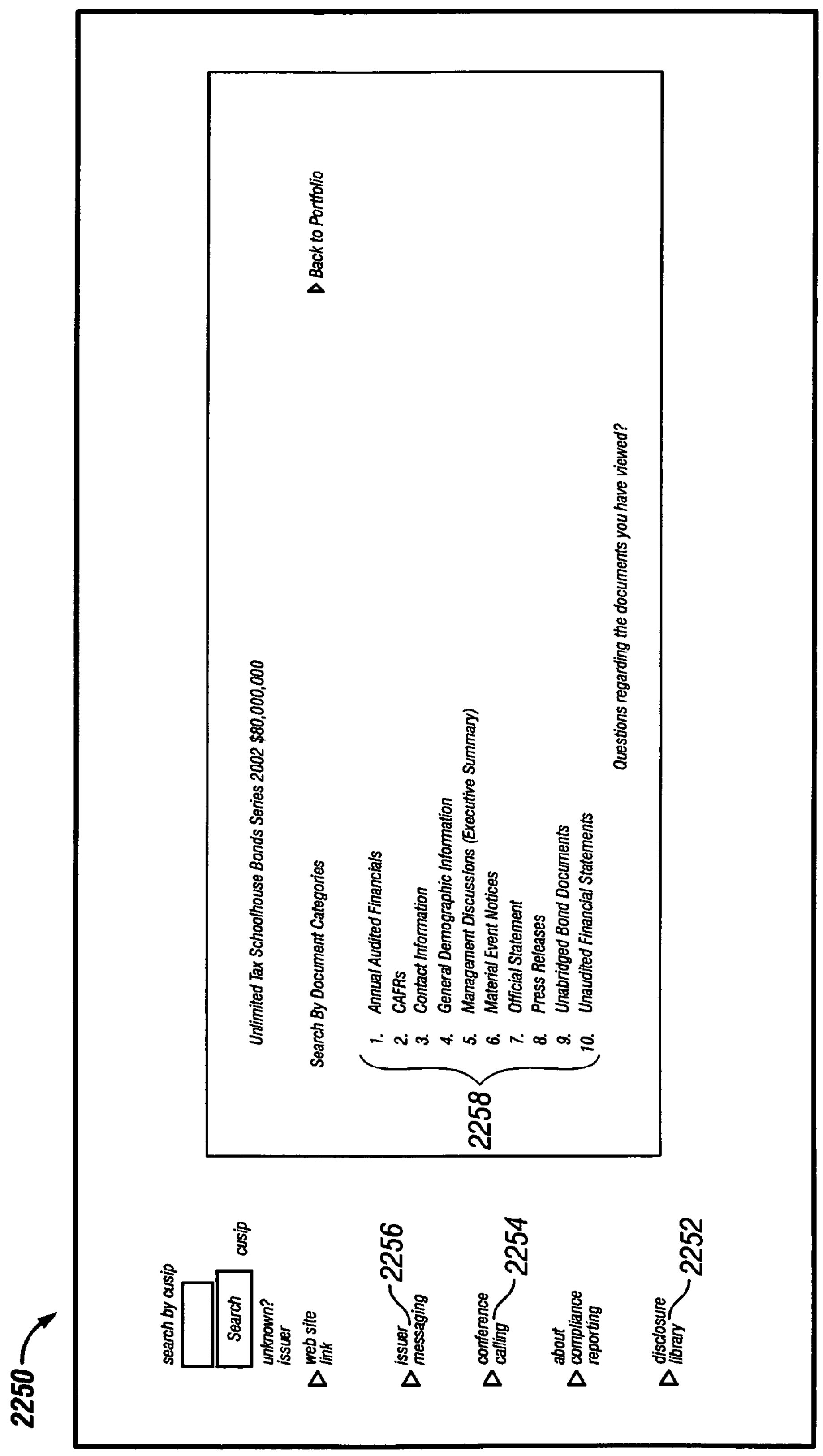
FIG. 22B is a screen that displays the document categories.

After the search is conducted, screen 2200 (FIG. 22A) is displayed showing the bonds that matched the search criteria (2004). As shown in screen 2200, only one bond was retrieved in this particular example. A visitor can view more information on this bond by selecting link 2202 (2006) which displays screen 2250 (FIG. 22B). Screen 2250 displays document categories 2258. Selecting the "MEN Notices" displays screen 2300 which displays a list of MENs and other options that allow the visitor to view more information about the bond (2008).

The visitor can view more information about an MEN by selecting view option 2302 from screen 2300 (2010). Upon selection of this option, the MSRB coversheet, screen 2400 (FIG. 24), is displayed showing detailed information about the selected MEN. For additional information, the visitor can download and view the file(s) listed in attachment field 2402.

Assuming the visitor navigates back to screen 2250, the visitor can choose to view "Official Statements," which includes disclosure documents (2012). Once this option is selected, screen 2500 (FIG. 25) is displayed. This screen lists disclosure documents that have been submitted by the issuer. To view the disclosure documents, the visitor selects the document description icon 2502 (2014). Upon selection of icon 2502, the file can be viewed or downloaded to the visitor's computer system. The visitor can then view the file to review the disclosure documents.

Figure 26:
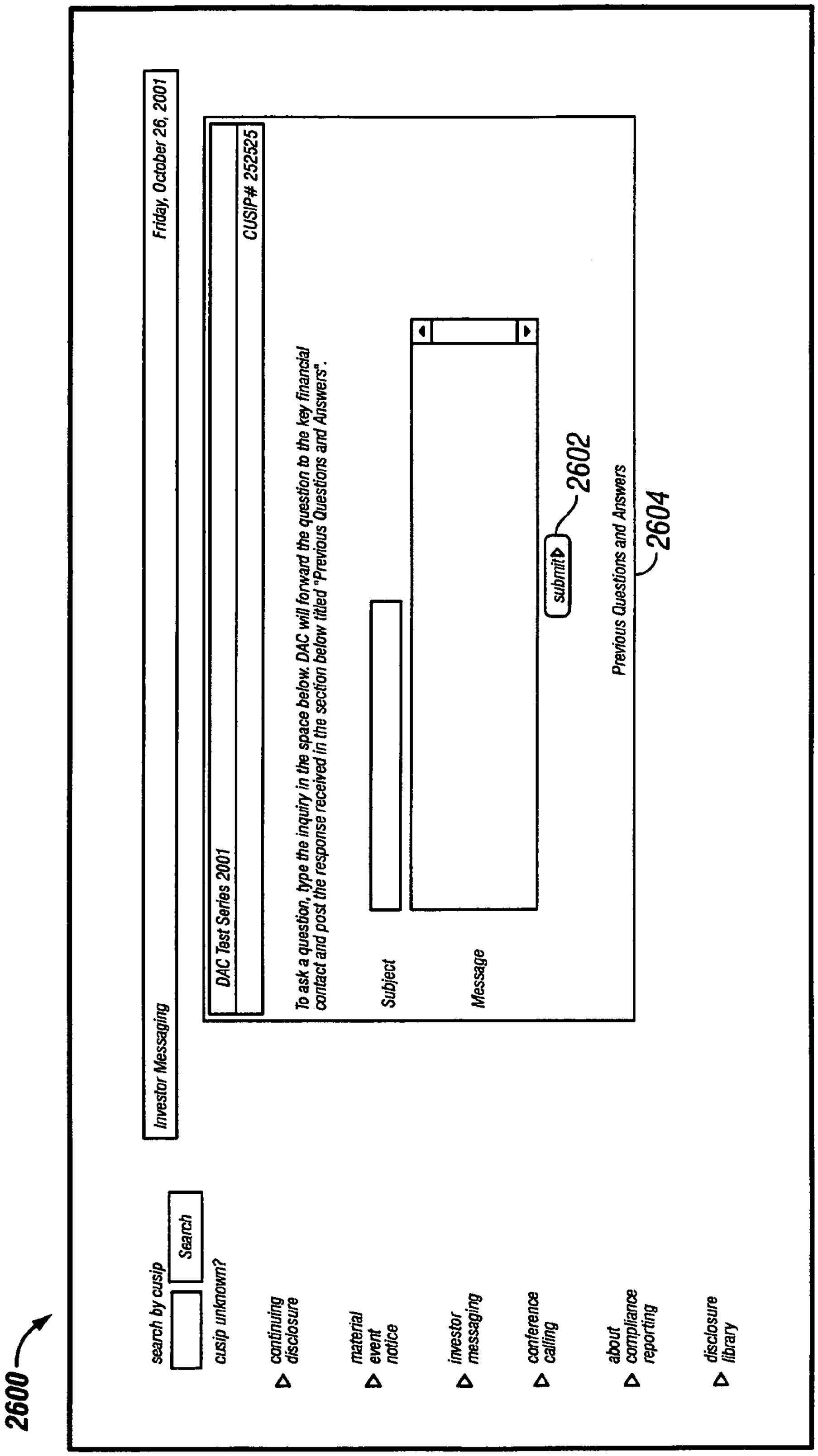
FIG. 26 is a screen that allows a visitor to draft an email message to an issuer.

With reference again to screen 2250, the visitor can select ask a question option 2256 to post a question to the issuer. Upon selection of this option, screen 2600 (FIG. 26) is presented so that the visitor can draft a message to the issuer (2016). After the message is drafted, the visitor selects submit button 2602 to post the message. Also from screen 2600, the visitor can review previous questions and answers by selecting option 2604. The visitor can return to option 2604 some time after submitting the question to see if the issuer has submitted a reply to the question. If the visitor selects this option, screen 2700 (FIG. 27) appears. Screen 2700 displays questions that have been previously submitted to the issuer, along with any responses (2018). In this manner, the visitor can get answers to questions he has about a particular bond.

Figure 28:
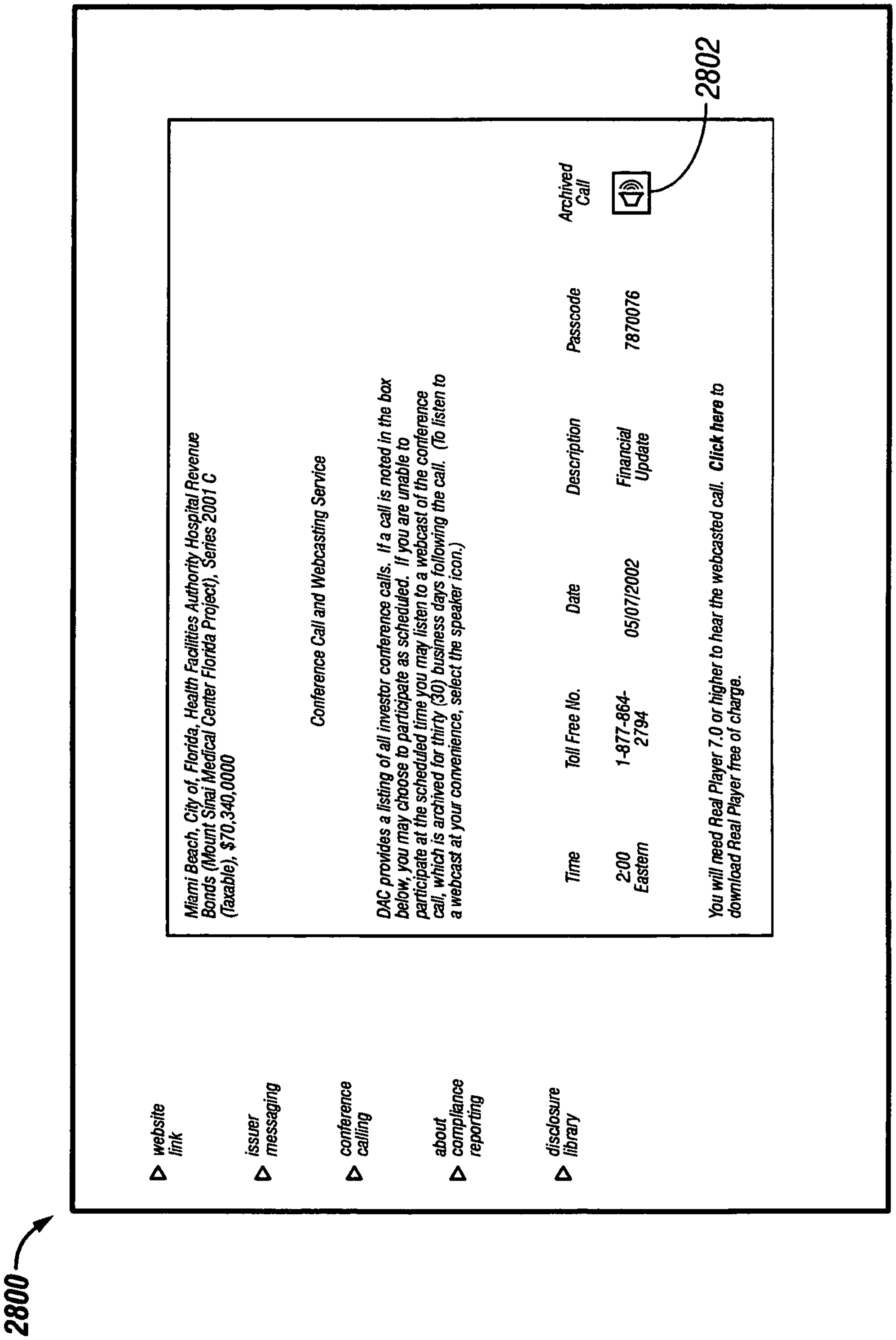
FIG. 28 is a screen that provides information on conference calls concerning the selected bond.

Returning to screen 2250, the visitor can select option 2254 to retrieve information about upcoming conference calls related to the bond. Upon making this selection, screen 2800 (FIG. 28) is displayed (2020). Screen 2800 displays information about upcoming call as well as previous conference calls. These previous calls are stored for some period of time and can be played back by the visitor by selecting achieved call icon 2802.

Returning to screen 2250, a user can also select option 2252 to view reference material about various types of bonds.

As indicated above, aspects of this invention pertain to specific "method functions" that can be implemented through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network (LAN), a telephone network, or a public network like the Internet. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

The invention claimed is:

1. A method of managing bonds via a web site, comprising:

- electronically receiving, at the web site, disclosure documents and material event notices about a bond from a bond issuer;
- making the disclosure documents and material event notices available to others via the web site;
- sending the disclosure documents and material event notices from the web site to one or more computer systems associated with one or more municipal disclosure repositories via a computer network;
- sending electronic reminders from the web site to the bond issuer of due dates when additional disclosure documents are required;
- generating, via the web site, a failure to file notice if a required disclosure document is not received by a due date; and
- electronically transmitting the failure to file notice from the web site to at least one or more municipal disclosure repositories.

2. The method described in claim 1, wherein the receiving step includes providing templates containing common items of disclosure documents and material event notices, and receiving files that contain additional information relating to at least one of the disclosure documents and material event notices.

3. The method as described in claim 1, further comprising:

viewing questions from visitors to the web site; and displaying replies to the questions over the computer network.

4. The method as described in claim 1, further comprising displaying a list of information that has been sent to one or more municipal disclosure repositories.

5. A computer system for managing bonds and enabling a bond issuer to comply with contractual obligations to bond holders, and for providing Brokers and Dealers with a mechanism for meeting regulatory requirements specified under Securities and Exchange Commission (SEC) Rule 15c2-12, comprising:

a computer system, connected to a network of other computers, wherein the computer system is operable in a particular mode of operation where the computer system:

receives, from a bond issuer, disclosure documents and material event notices about a bond, and stores the disclosure documents and material events notices for the life of the bond or until a termination of engagement with the bond issuer;

makes the disclosure documents and material event notices available to others via a computer network;

sends the disclosure documents and material event notices to one or more computer systems associated with one or more municipal disclosure repositories via the computer network;

sends electronic reminders to the bond issuer of due dates when additional disclosure documents are required;

generates a failure to file notice if a required disclosure document is not received by a due date; and electronically transmits the failure to file notice to at least one or more municipal disclosure repositories.

6. The computer system described in claim 5, wherein the particular mode of operation further includes the computer system:

providing templates containing common items of disclosure documents and material event notices, and receiving files that contain additional information relating to at least one of the disclosure documents and material event notices.

7. The computer system as described in claim 5, wherein the particular mode of operation further includes the computer system:

viewing questions from visitors; and displaying replies to the questions over the computer network.

8. The computer system as described in claim 5, wherein the particular mode of operation further includes the computer system displaying a list of information that has been sent to each of the one or more municipal disclosure repositories.

9. A computer system for managing bonds via a web site, comprising:

reception means for receiving, at a web site, disclosure documents and material event notices about a bond from a bond issuer;

means for making the disclosure documents and material event notices available to others via the web site;

sending means for sending the disclosure documents and material event notices to one or more computer systems associated with one or more municipal disclosure repositories via a computer network;

reminding means for sending electronic reminders to the bond issuer of due dates when additional disclosure documents are required;

means for generating, via the web site, a failure to file notice if a required disclosure document is not received by a due date; and means for electronically transmitting from the web site the failure to file notice to at least one or more municipal disclosure repositories.

10. The computer system described in claim 9, further comprising:

template provision means for providing templates containing common items of disclosure documents and material event notices; and means for receiving a file that contains additional information relating to at least one of the disclosure documents and material event notices.

11. The computer system as described in claim 9, further comprising:

viewing means for viewing questions from visitors to the web site; and reply displaying means for displaying replies to the questions.

12. The computer system as described in claim 9, further comprising a display means for displaying a list of information that has been sent to each of the one or more municipal disclosure repositories.

13. A computer-implemented system for managing bond information including continuing disclosure documents and material event notices, the system comprising:

a database for storing bond information for a number of bonds, and associating an issuer with individual ones of the bonds;

means for presenting to a user, via a graphical user interface, options to enable the user to:

i) enter information for a new bond; or ii) submit one or more filing information items for at least one bond, wherein a filing information item includes at least one of a continuing disclosure document or a material event notice;

means for electronically submitting, through the system, one or more filing information items to one or more municipal disclosure repositories;

means for receiving confirmation of receipt from the one or more municipal disclosure repositories to which the one or more filing information items were submitted;

means for determining whether a confirmation receipt was received; and means, responsive to the means for determining, for generating an alert indicating when a confirmation receipt is not received.

14. The system of claim 13, wherein the database includes means for storing continuing disclosure documents and material event notices associated with a bond.

15. The system of claim 13, wherein the graphical user interface comprises means for reviewing the status of one or more filing information items submitted to one or more municipal disclosure repositories for a selected bond.

16. The system of claim 13, wherein the graphical user interface comprises means for reviewing the status of one or more filing information items submitted to one or more municipal disclosure repositories for a selected bond, including:

i) a list of one or more filing information items which have been submitted to one or more municipal disclosure repositories;

ii) a list of particular municipal disclosure repositories to which each of the one or more filing information items were submitted; and iii) an identifier of the selected bond for which the one or more filing information items were submitted.

17. The system of claim 13, further comprising:

publishing means for publishing the one or more filing information items to make the items available to the public.

18. The system of claim 13, further comprising means for determining if the one or more filing information items were received by a due date, and further comprising means for generating a failure to file notice if the one or more filing information items were not received by the due date.

19. The system of claim 13, further comprising means for determining when a due date for filing a filing information item relating to a particular bond is due, and means for prompting the issuer associated with the bond to file the filing information item by the due date.

20. The system of claim 19, further comprising:

means for determining if the filing information item was received by the due date;

means for generating a failure to file notice if the filing information item was not received by the due date; and means for electronically transmitting the failure to file notice to one or more central locations.

21. The system of claim 19, further comprising:

means for determining if the filing information item was received by the due date;

means for automatically generating a failure to file notice if the filing information item was not received by the due date; and means for electronically transmitting the failure to file notice to one or more municipal disclosure repositories.

22. The system of claim 19, further comprising:

means for determining if the filing information item was received by the due date; and means for automatically generating and making publicly available a failure to file notice if the filing information item was not received by the due date.

23. The system of claim 13, further comprising audit trail means for generating an audit trail of filing information items in the system, and means for receiving and archiving a receipt that one or more filing information items were submitted to one or more municipal disclosure repositories.

24. The system of claim 13, further comprising means for enabling secure communication among an issuer and investors via electronic messaging through the system.

25. The system of claim 13, further comprising means for enabling secure communication among an issuer and investors via teleconferencing through the system.

26. The system of claim 13, wherein the database includes all continuing disclosure documents and material event notices filed in association with a particular bond.

27. The system of claim 13, further comprising means for displaying a list of:

i) all continuing disclosure documents and material event notices that have been submitted to the one or more municipal disclosure repositories for a particular bond;

ii) one or more particular municipal disclosure repositories to which a particular continuing disclosure document or material event notice was submitted; and iii) the date a continuing disclosure document or material event notice was submitted.

28. A computer-implemented method for managing bond information, the method comprising:

registering a user;

associating one or more bonds with the user;

displaying a list of the one or more bonds associated with the user; and providing options to enable the user to:

i) submit one or more filing information items, including a continuing disclosure document for at least one bond, or a material event notice for at least one bond; and ii) review one or more filing information items previously submitted to one or more municipal disclosure repositories;

transmitting one or more filing information items to one or more municipal disclosure repositories;

receiving confirmation of receipt by the one or more municipal disclosure repositories;

generating a failure to file notice if a required filing information item is not received by a due date; and means for electronically transmitting the failure to file notice to at least one or more municipal disclosure repositories.

29. The method of claim 28, further comprising the steps of, in response to the user selecting an option to file a continuing disclosure document for at least one bond:

providing an option for the user to prepare a new continuing disclosure document;

displaying a list of predefined document descriptions; and receiving a selection from the user corresponding to one or more of the document descriptions.

30. The method of claim 29, further comprising the step of, in response to receiving a selection from the user corresponding to one or more of the predefined document descriptions, prompting the user to provide information relating to at least one document corresponding to the selected document description.

31. The method of claim 29, further comprising the step of, in response to receiving a selection from the user corresponding to one or more of the predefined document descriptions, prompting the user to provide information relating to at least one document corresponding to the selected document description, and to attach any attachments to be associated with the at least one document.

32. The method of claim 29, further comprising the step of, in response to the user selecting an option to file a continuing disclosure document for at least one bond, providing an option for the user to prepare a new disclosure or amend an existing disclosure.

33. The method of claim 29, further comprising the step of electronically submitting the continuing disclosure document to the one or more municipal disclosure repositories.

34. The method of claim 29, further comprising the step of electronically submitting the continuing disclosure document to the one or more municipal disclosure repositories, and electronically receiving confirmation of receipt of the continuing disclosure document by the one or more municipal disclosure repositories.

35. The method of claim 29, further comprising the step of:

automatically preparing a Municipal Securities Rulemaking Board cover sheet for the continuing disclosure document and electronically submitting the continuing disclosure document to one or more municipal disclosure repositories.

36. The method of claim 28, further comprising the step of, in response to the user selecting an option to file a material event notice for at least one bond, displaying a list of predefined events to the user and receiving a selection from the user corresponding to one or more of the events.

37. The method of claim 36, further comprising the step of receiving from the user a selection of one or more bonds for the one or more selected events, and prompting the user to provide information related to the one or more selected events.

38. The method of claim 36 further comprising the steps of:

receiving a selection from the user of one or more bonds for the one or more selected events;

prompting the user to provide information related to the one or more selected events; and receiving information from the user.

39. The method of claim 36, further comprising the steps of:

receiving a selection from the user of one or more bonds for the one or more selected events;

prompting the user to provide information related to the one or more selected events and to attach any attachments to be associated with one or more documents associated with the one or more selected events; and receiving information from the user and any attachments to be associated with the one or more documents.

40. The method of claim 36, further comprising the step of electronically submitting the material event notice to the one or more municipal disclosure repositories.

41. The method of claim 36, further comprising the steps of electronically submitting the material event notice to the one or more municipal disclosure repositories, and electronically receiving confirmation of receipt of the material event notice by the one or more municipal disclosure repositories.

42. The method of claim 36 further comprising the steps of:

automatically preparing a Municipal Securities Rulemaking Board cover sheet for the material event notice, and electronically submitting the material event notice to one or more municipal disclosure repositories.

43. The method of claim 36, further comprising the steps of:

displaying list of one or more material event notices previously submitted for a particular bond; and providing options to enable the user to view or delete one or more of the material event notices.

44. A computer-implemented method of managing bond information, the method comprising:

registering an issuer user;

associating one or more bonds with the issuer user;

determining a due date for subsequent filing information items required for at least one bond;

determining if a required filing information item was received by a determined due date;

automatically generating a failure to file notice if the required filing information item was not received by the due date; and electronically transmitting the failure to file notice to at least one or more municipal disclosure repositories.

45. A computer-implemented method of managing bond information to facilitate compliance with Securities and Exchange Commission (SEC) Rule 15c2-12, the method comprising:

registering an issuer user;

associating one or more bonds with the issuer user;

determining a due date for subsequent filing information items required for at least one bond pursuant to SEC Rule 15c2-12;

determining if a required filing information item was received by a determined due date;

automatically generating a failure to file notice if the required filing information item was not received by the due date; and making publicly y available to at least Brokers and Dealers the failure to file notice if the required filing information item was not received by the due date.

46. A computer-implemented method of managing bond information, the method comprising:

registering an issuer user;

associating one or more bonds with the issuer user;

determining a due date for subsequent filing information items required for at least one bond;

prompting the issuer user to file a required filing information item by a determined due date;

determining if the required filing information item was received by the due date;

generating a failure to file notice if the required filing information item was not received by the due date; and electronically transmitting the failure to file notice to at least one or more municipal disclosure repositories.

47. A computer-implemented method of managing bond information to facilitate compliance with Securities and Exchange Commission (SEC) Rule 15c2-12, the method comprising:

registering an issuer user;

associating one or more bonds with the issuer user;

determining a due date for subsequent filing information items required for at least one bond pursuant to SEC Rule 15c2-12;

prompting the issuer user to file a required filing information item by a determined due date;

determining if the required filing information item was received by the due date;

generating a failure to file notice if the required filing information item was not received by the due date; and making publicly available to at least Brokers and Dealers the failure to file notice if the required filing information item was not received by the due date.

48. The method as described in claim 1, wherein the bond issuer comprises an issuer, an issuer's agent, or an issuer's attorney.

49. The method as described in claim 1, further comprising:

enabling Brokers and Dealers to access the web site to facilitate compliance with Securities and Exchange Commission (SEC) Rule 15c2-12.

50. The computer system as described in claim 5, wherein the bond issuer comprises an issuer, an issuer's agent, or an issuer's attorney.

51. The computer system as described in claim 5, wherein the particular mode of operation further includes the computer system:

enabling Brokers and Dealers to access the computer system to facilitate compliance with Securities and Exchange Commission (SEC) Rule 15c2-12.

52. The computer system as described in claim 9, wherein the bond issuer comprises an issuer, an issuer's agent, or an issuer's attorney.

53. The computer system as described in claim 9, further comprising:

means for enabling Brokers and Dealers to access the web site to facilitate compliance with Rule 15c2-12.

* * * * *

UNITED STATES PATENT AND TRADEMARK OFFICE

CERTIFICATE OF CORRECTION

PATENT NO. : 7,155,408 B2
APPLICATION NO. : 10/314863
DATED : December 26, 2006
INVENTOR(S) : Sharda Hebbar et al.

It is certified that error appears in the above-identified patent and that said Letters Patent is hereby corrected as shown below:

Column 14, line 21, [claim 28, line 21], change “means for electronically transmitting the failure to file” to --electronically transmitting the failure to file--; and Column 16, line 6, [claim 45, line 15], change “making publicly y available to at least Brokers and” to --making publicly available to at least Brokers and--.

Signed and Sealed this

Twenty-seventh Day of March, 2007

JON W. DUDAS
*Director of the United States Patent and Trademark Office*